US012130707B2

(12) United States Patent
Mayo et al.

(10) Patent No.: US 12,130,707 B2
(45) Date of Patent: Oct. 29, 2024

(54) BACK-REFERENCE DATA STRUCTURE FOR A DEDUPLICATION STORAGE SYSTEM

(71) Applicant: HEWLETT PACKARD ENTERPRISE DEVELOPMENT LP, Spring, TX (US)

(72) Inventors: Richard Phillip Mayo, Bristol (GB); Aman Sahil, Bristol (GB); Callum Murray, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 119 days.

(21) Appl. No.: 18/185,202

(22) Filed: Mar. 16, 2023

(65) Prior Publication Data
US 2024/0311255 A1 Sep. 19, 2024

(51) Int. Cl.
G06F 16/215 (2019.01)
G06F 11/14 (2006.01)

(52) U.S. Cl.
CPC ...... G06F 11/1453 (2013.01); G06F 2201/84 (2013.01)

(58) Field of Classification Search
CPC .......... G06F 11/1453; G06F 2201/84
See application file for complete search history.

(56) References Cited

U.S. PATENT DOCUMENTS

| 8,884,285 | B2 | 11/2014 | Lu et al. |
| 9,449,688 | B2 | 9/2016 | Thomas et al. |
| 9,721,661 | B1 | 8/2017 | Buchanan et al. |
| 9,847,132 | B1 | 12/2017 | Zheng et al. |
| 9,934,857 | B2 | 4/2018 | Zheng et al. |
| 10,079,059 | B2 | 9/2018 | Buchanan |
| 10,365,974 | B2 | 7/2019 | Todd et al. |
| 10,522,221 | B2 | 12/2019 | Han |
| 10,559,355 | B2 | 2/2020 | Harrand et al. |
| 2013/0226978 | A1* | 8/2013 | Bestler .................. G06F 16/22 707/827 |
| 2020/0320040 | A1 | 10/2020 | Butt |

* cited by examiner

Primary Examiner — Tyler J Torgrimson
(74) Attorney, Agent, or Firm — Trop, Pruner & Hu, P.C.

(57) ABSTRACT

Example implementations relate to deduplication operations in a storage system. An example includes generating a housekeeping work map to delete a backup item stored in a deduplication storage system; selecting a first work entry of the housekeeping work map, where the first work entry identifies a first container index and a first manifest; in response to a selection of the first work entry, loading the first container index into the memory, the first container index comprising a back-reference data structure; identifying, in the back-reference data structure, a back-reference entry indexed to the first manifest; determining, using the back-reference entry indexed to the first manifest, a first set of data units included in the first manifest and that are indexed in the first container index; and decrementing, in the first container index, a set of reference counts for the determined first set of data units.

20 Claims, 15 Drawing Sheets

Machine Readable Medium
900

910
Generate a housekeeping work map to delete a backup item stored in a deduplication storage system, where the deduplication storage system stores a plurality of manifests to record an arrival order of a plurality of data units included in the backup item

920
Select a first work entry of the housekeeping work map, where the first work entry identifies a first container index and a first manifest

930
In response to a selection of the first work entry, load the first container index into the memory, the first container index comprising a back-reference data structure

940
Identify, in the back-reference data structure, a back-reference entry indexed to the first manifest

950
Determine, using the back-reference entry indexed to the first manifest, a first set of data units included in the first manifest and that are indexed in the first container index

960
Decrement, in the first container index, a set of reference counts for the determined first set of data units

FIG. 9

BACK-REFERENCE DATA STRUCTURE FOR A DEDUPLICATION STORAGE SYSTEM

BACKGROUND

Data reduction techniques can be applied to reduce the amount of data stored in a storage system. An example data reduction technique includes data deduplication. Data deduplication identifies data units that are duplicative, and seeks to reduce or eliminate the number of instances of duplicative data units that are stored in the storage system.

BRIEF DESCRIPTION OF THE DRAWINGS

Some implementations are described with respect to the following figures.

FIG. 9 is a diagram of an example machine-readable medium storing instructions in accordance with some implementations.

Figure 1:
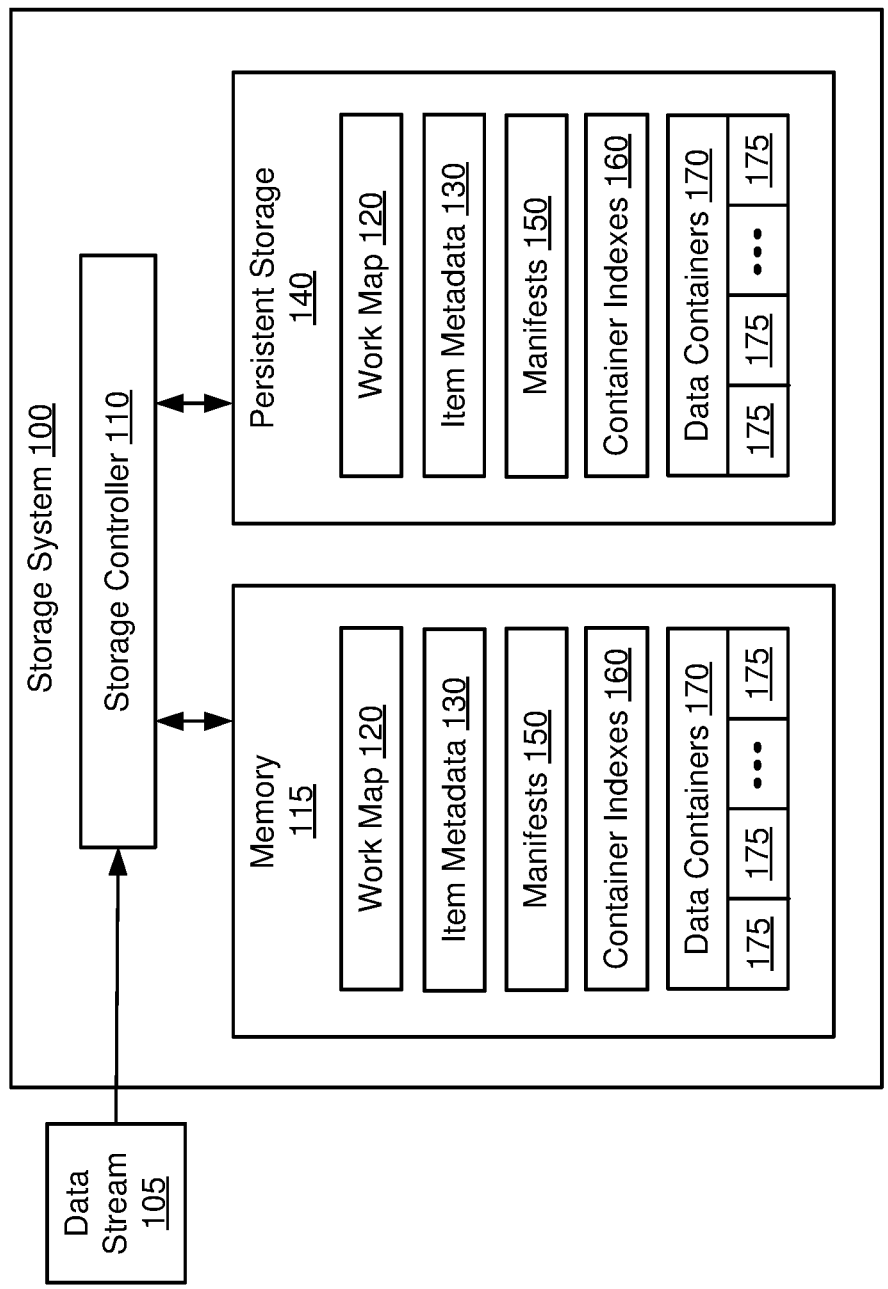
FIG. 1 is a schematic diagram of an example storage system, in accordance with some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, a storage system may back up a collection of data (referred to herein as a "stream" of data or a "data stream") in deduplicated form, thereby reducing the amount of storage space required to store the data stream. The storage system may create a "backup item" to represent a data stream in a deduplicated form. The storage system may perform a deduplication process including breaking a stream of data into discrete data units (or "chunks") and determining "fingerprints" (described below) for these incoming data units. Further, the storage system may compare the fingerprints of incoming data units to fingerprints of stored data units, and may thereby determine which incoming data units are duplicates of previously stored data units (e.g., when the comparison indicates matching fingerprints). In the case of data units that are duplicates, the storage system may store references to previously stored data units instead of storing the duplicate incoming data units.

As used herein, the term "fingerprint" refers to a value derived by applying a function on the content of the data unit (where the "content" can include the entirety or a subset of the content of the data unit). An example of a function that can be applied includes a hash function that produces a hash value based on the content of an incoming data unit. Examples of hash functions include cryptographic hash functions such as the Secure Hash Algorithm 2 (SHA-2) hash functions, e.g., SHA-224, SHA-256, SHA-384, etc. In other examples, other types of hash functions or other types of fingerprint functions may be employed.

A "storage system" can include a storage device or an array of storage devices. A storage system may also include storage controller(s) that manage(s) access of the storage device(s). A "data unit" can refer to any portion of data that can be separately identified in the storage system. In some cases, a data unit can refer to a chunk, a collection of chunks, or any other portion of data. In some examples, a storage system may store data units in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof.

A "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

In some examples, a deduplication storage system may use metadata for processing inbound data streams (e.g., backup items). For example, such metadata may include data recipes (also referred to herein as "manifests") that specify the order in which particular data units are received for each backup item. Further, such metadata may include item metadata to represent each received backup item (e.g., a data stream) in a deduplicated form. The item metadata may include identifiers for a set of manifests, and may indicate the sequential order of the set of manifests. The processing of each backup item may be referred to herein as a "backup process." Subsequently, in response to a read request, the deduplication system may use the item metadata and the set of manifests to determine the received order of data units, and may thereby recreate the original data stream of the backup item. Accordingly, the set of manifests may be a representation of the original backup item. The manifests may include a sequence of records, with each record representing a particular set of data unit(s). The records of the manifest may include one or more fields that identify container indexes that index (e.g., include storage information for) the data units. For example, a container index may include one or more fields that specify location information (e.g., containers, offsets, etc.) for the stored data units, compression and/or encryption characteristics of the stored data units, and so forth. Further, the container index may include reference counts that indicate the number of manifests that reference each data unit.

In some examples, upon receiving a data unit (e.g., in a data stream), it may be matched against one or more container indexes to determine whether an identical chunk is already stored in a container of the deduplication storage system. For example, the deduplication storage system may compare the fingerprint of the received data unit against the fingerprints in one or more container indexes. If no matching fingerprints are found in the searched container index(es), the received data unit may be added to a container, and an entry for the received data unit may be added to a container index corresponding to that container. However, if a matching fingerprint is found in a searched container index, it may be determined that a data unit identical to the received data unit is already stored in a container. In response to this determination, the reference count of the corresponding entry is incremented, and the received data unit is not stored in a container (as it is already present in one of the containers), thereby avoiding storing a duplicate data unit in the deduplication storage system. As used herein, the term "matching operation" may refer to an operation to compare fingerprints of a collection of multiple data units (e.g., from a particular backup data stream) against fingerprints stored in a container index.

In some examples, the deduplication storage system may perform housekeeping jobs or processes to maintain the accuracy of the included metadata. For example, when a data unit is deleted from a given manifest (e.g., due to a change to the data stream or item represented by the manifest), a housekeeping job may include decrementing the reference count for that data unit by one (i.e., indicating that the data unit is referenced by one less manifest). In some examples, a housekeeping job to delete a backup item may include identifying the manifests included in the backup item, sequentially accessing and loading these manifests into memory, and reading the manifests to determine the container identifiers and address information for the data units in each manifest. The housekeeping job may also include accessing and loading the container indexes (e.g., using the container identifiers) into memory, decrementing the reference counts for the data units (e.g., using the address information for the data units), and then saving the container indexes to persistent storage. Accordingly, performing such housekeeping jobs may involve a relatively large number of input/output (I/O) operations to load multiple metadata items (e.g., manifests and container indexes) from persistent storage to memory, and to write at least some of the multiple metadata items from memory to persistent storage. Accordingly, performing such housekeeping jobs may reduce the performance of the deduplication storage system.

In accordance with some implementations of the present disclosure, a controller of a deduplication storage system may generate a housekeeping work map for performing a housekeeping job (e.g., to delete a backup item that is no longer needed). An entry of the work map (also referred to as a "work entry") may identify a container index and a manifest. The controller may select a work entry for processing, and may then load the container index identified in the work entry from persistent storage to memory. The controller may access or read a back-reference data structure included in the container index. Each entry of the back-reference data structure (also referred to as a "back-reference entry") may specify a different manifest and a data unit range. The data unit range may identify a set of data units that are included in the specified manifest and that are indexed by the container index. The controller may select the back-reference entry that specifies the same manifest that is identified in the work entry, and may extract the data unit range specified in the selected back-reference entry. The controller may then decrement, in the container index, the reference counts that correspond to the extracted data unit range. In this manner, the work entry may be processed without loading the manifest into memory. Accordingly, some implementations may reduce the amount of I/O bandwidth used for housekeeping jobs, and may thereby improve the performance of the storage system. Various aspects of the disclosed housekeeping process are discussed further below with reference to FIGS. 1-9.

FIG. 1—Example Storage System

FIG. 1 shows an example of a storage system 100 that includes a storage controller 110, memory 115, and persistent storage 140, in accordance with some implementations. The persistent storage 140 may include one or more non-transitory storage media such as hard disk drives (HDDs), solid state drives (SSDs), optical disks, and so forth, or a combination thereof. The memory 115 may be implemented in semiconductor memory such as random access memory (RAM). In some examples, the storage controller 110 may be implemented via hardware (e.g., electronic circuitry) or a combination of hardware and programming (e.g., comprising at least one processor and instructions executable by the at least one processor and stored on at least one machine-readable storage medium).

As shown in FIG. 1, the memory 115 and the persistent storage 140 may store various data structures including at least a work map 120, item metadata 130, manifests 150, container indexes 160, and data containers 170. In some examples, copies of the manifests 150, container indexes 160, and the data containers 170 may be transferred between the memory 115 and persistent storage 140 (e.g., via read and write input/output (I/O) operations).

In some implementations, the storage system 100 may perform deduplication of stored data. For example, the storage controller 110 may receive an inbound data stream 105 (also referred to herein as a "backup item") including multiple data units, and may store at least one copy of each data unit in a data container 170 (e.g., by appending the data units to the end of the data container 170). In some examples, each data container 170 may be divided into entities 175, where each entity 175 includes multiple stored data units.

In one or more implementations, the storage controller 110 may generate a fingerprint for each received data unit. For example, the fingerprint may include a full or partial hash value based on the data unit. To determine whether an incoming data unit is a duplicate of a stored data unit, the storage controller 110 may compare the fingerprint generated for the incoming data unit to the fingerprints in at least one container index. If a match is identified, then the storage controller 110 may determine that a duplicate of the incoming data unit is already stored by the storage system 100. The storage controller 110 may then store references to the previous data unit, instead of storing the duplicate incoming data unit.

In some implementations, the storage controller 110 may generate item metadata 130 to represent each received backup item (e.g., a data stream 105) in a deduplicated form. Each item metadata 130 may include identifiers for a set of manifests 150, and may indicate the sequential order of the set of manifests 150. The manifests 150 record the order in which the data units were received. Further, the manifests 150 may include a pointer or other information indicating the container index 160 that indexes each data unit. In some implementations, the container index 160 may indicate the location in which the data unit is stored. For example, the container index 160 may include information specifying that the data unit is stored at a particular offset in an entity, and that the entity is stored at a particular offset in a data container 170. Further, the container index 160 may include reference counts that indicate the number of manifests 150 that reference each data unit.

In some implementations, the storage controller 110 may receive a read request to access the stored data, and in response may access the item metadata 130 and manifests 150 to determine the sequence of data units that made up the original data. The storage controller 110 may then use pointer data included in a manifest 150 to identify the container indexes 160 that index the data units. Further, the storage controller 110 may use information included in the identified container indexes 160 (and information included in the manifest 150) to determine the locations that store the data units (e.g., data container 170, entity 175, offsets, etc.), and may then read the data units from the determined locations.

In some implementations, the storage controller 110 may use the work map 120 to perform housekeeping jobs of the storage system 100. For example, the storage controller 110 may receive a request to delete a particular backup item, and in response may schedule a housekeeping job to be executed at a later time. Upon initiating the housekeeping job, the storage controller 110 may load the item metadata 130 for the backup item from persistent storage 140 into the memory 115. In some implementations, the storage controller 110 may use the item metadata 130 to identify the manifests 150 that represent the backup item, and to identify the container indexes 160 referenced by the identified manifests 150. The storage controller 110 may populate the work map 120 with a set of work entries corresponding to the container indexes 160 identified in the item metadata 130. Each work entry may identify the corresponding container index 160, and may also identify a set of manifests 150 that each reference the corresponding container index 160. Some example implementations of the work map 120 and the item metadata 130 are discussed below with reference to FIGS. 4A-5E.

In some implementations, the storage controller 110 may select a work entry of the work map 120 for processing, and may then load the container index 160 identified in the work entry from persistent storage 140 to memory 115. The container index 160 may include a data structure to store a set of back-reference entries, where each back-reference entry specifies a different manifest 150 and a data unit range (e.g., information to identify a set of data units that are included in the manifest 150 and that are indexed by the container index 160). The storage controller 110 may select the back-reference entry that specifies the same manifest 150 that is identified in the work entry, and may extract the data unit range specified in the selected back-reference entry. The data unit range (extracted from the back-reference entry) may be used to deterministically identify one or more data units that have reference counts to be decremented for the housekeeping job. The storage controller 110 may then decrement, in the container index 160, the reference counts that correspond to the one or more data units identified by the extracted data unit range. In this manner, use of the back-reference entries in the container index 160 may allow the appropriate reference counts to be decremented for the housekeeping job, but without having to load the manifests 150 into memory to identify the one or more data units associated with those reference counts. Accordingly, some implementations may reduce the amount of I/O bandwidth used for housekeeping jobs, and may thereby improve the performance of the deduplication storage system 100.

In some implementations, the storage controller 110 may use the item metadata 130 to obtain, for each combination of a manifest 150 and a container index 160 (also referred to as a "manifest-CI combination") identified in the item metadata 130, a Boolean flag (also referred to as a "back-reference flag" or "BR flag") indicating whether that particular manifest-CI combination is to be processed using the back-reference entries included in the container index 160. The storage controller 110 may populate the work entries of the work map 120 based on the back-reference flags associated with each manifest. For example, if the back-reference flag is set to a "false" value (i.e., indicating that the manifest-CI combination is not to be processed using a back-reference entry), the storage controller 110 loads the manifest 150 into memory 115 to determine the data unit ranges that correspond to the reference counts to be decremented in the container index 160, and then appends the determined data unit ranges and an identifier of the manifest 150 to the work entry (e.g., in a data field). Otherwise, if the back-reference flag is set to a "true" value (i.e., indicating that the manifest-CI combination is to be processed using a back-reference entry), the storage controller 110 appends the identifier of the manifest 150 to the work entry, but does not load the manifest 150 into memory 115, and does not append the data unit ranges to the work entry. Example processes for performing housekeeping using back-reference data structures are discussed further below with reference to FIGS. 3A-3B.

Figure 2:
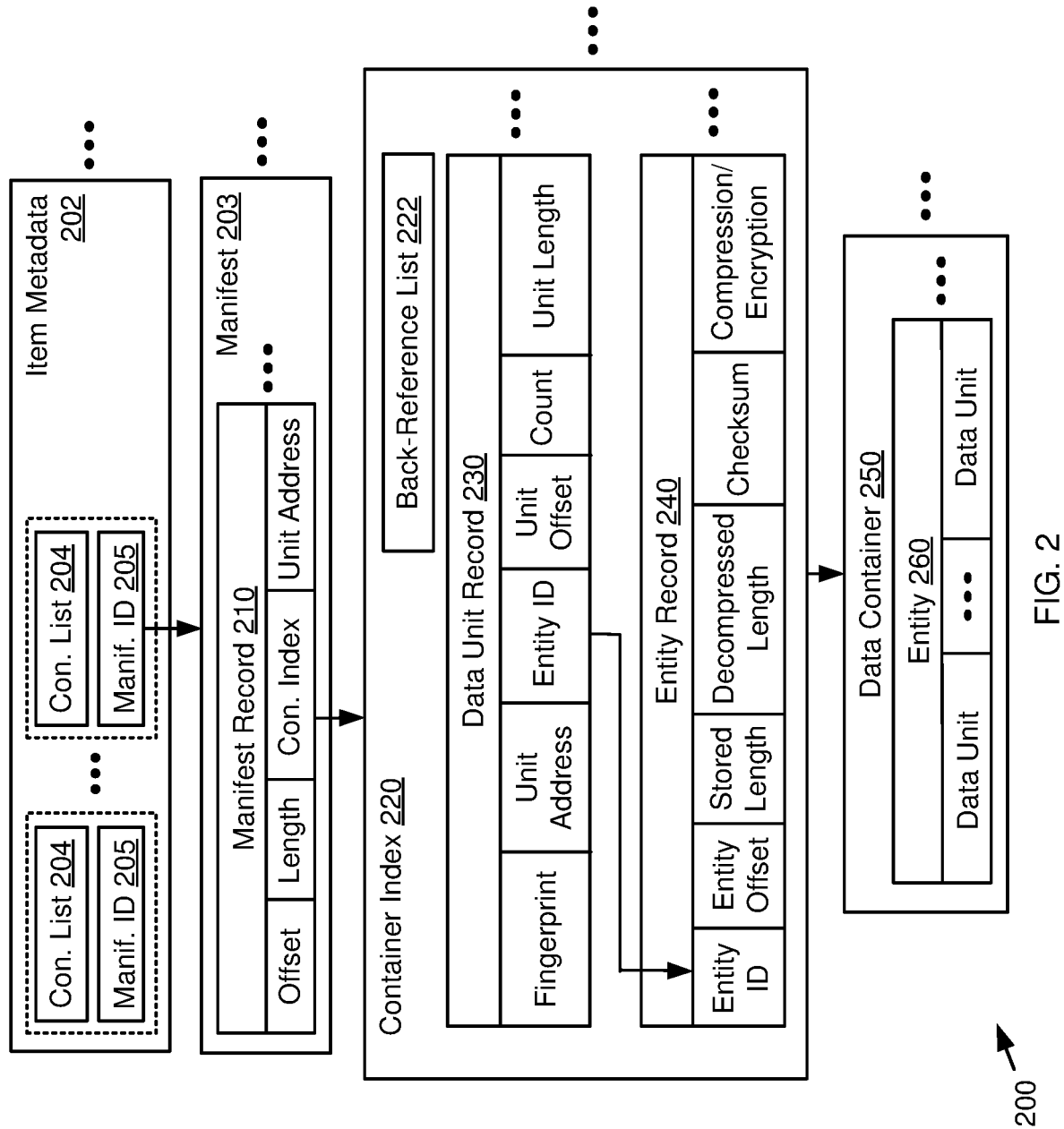
FIG. 2 is an illustration of example data structures, in accordance with some implementations.

FIG. 2—Example Data Structures

Referring now to FIG. 2, shown is an illustration of example data structures 200 used in deduplication, in accordance with some implementations. As shown, the data structures 200 may include item metadata 202, a manifest 203, a container index 220, and a data container 250. In some examples, the item metadata 202, the manifest 203, the container index 220, and the data container 250 may correspond generally to example implementations of item metadata 130, a manifest 150, a container index 160, and a data container 170 (shown in FIG. 1), respectively. In some examples, the data structures 200 may be generated and/or managed by the storage controller 110 (shown in FIG. 1).

In some implementations, the item metadata 202 may include multiple manifests identifiers 205. Each manifests identifier 205 may identify a different manifest 203. In some implementations, the manifests identifiers 205 may be arranged in a stream order (i.e., based on the order of receipt of the data units represented by the identified manifests 203). Further, the item metadata 202 may include a container list 204 associated with each manifest identifier 205. In some implementations, the container list 204 may include identifiers for a set of container indexes 220 that index the data units included in the associated manifest 203 (i.e., the manifest 203 identified by the associated manifest identifier 205).

Further, in some implementations, the container list 204 may include a back-reference flag associated with each container index identifier. The back-reference flag may indicate whether the manifest-CI combination (corresponding to the associated container index identifier and the manifest identifier 205) is to be processed using the back-reference list 222 (discussed below) included in the container index 220. An example implementation of the container list 204 is described below with reference to FIGS. 4A-4G.

Although one of each is shown for simplicity of illustration in FIG. 2, data structures 200 may include a plurality of instances of item metadata 202, each including or pointing to one or more manifests 203. In such examples, data structures 200 may include a plurality of manifests 203. The manifests 203 may reference a plurality of container indexes 220, each corresponding to one of a plurality of data containers 250. Each container index 220 may comprise one or a plurality of data unit records 230, and one or a plurality of entity records 240.

As shown in FIG. 2, in some examples, each manifest 203 may include one or more manifest records 210. Each manifest record 210 may include various fields, such as offset, length, container index, and unit address. In some implementations, each container index 220 may include any number of data unit record(s) 230 and entity record(s) 240. Each data unit record 230 may include various fields, such as a fingerprint (e.g., a hash of the data unit), a unit address, an entity identifier, a unit offset (i.e., an offset of the data unit within the entity), a reference count value, and a unit length. In some examples, the reference count value may indicate the number of manifest records 210 that reference the data unit record 230. Further, each entity record 240 may include various fields, such as an entity identifier, an entity offset (i.e., an offset of the entity within the container), a stored length (i.e., a length of the data unit within the entity), a decompressed length, a checksum value, and compression/encryption information (e.g., type of compression, type of encryption, and so forth). In some implementations, each container 250 may include any number of entities 260, and each entity 260 may include any number of stored data units.

In some implementations, the unit address (included in the manifest record 210 and the data unit record 230) may be an identifier that deterministically identifies a particular data unit within a given container index 220. In some examples, the unit address may be a numerical value (referred to as the "arrival number") that indicates the sequential order of arrival (also referred to as the "ingest order") of data units being indexed in a given container index 220 (e.g., when receiving and deduplicating an inbound data stream). For example, the first data unit to be indexed in a container index 220 (e.g., by creating a new data unit record 230 for the first data unit) may be assigned an arrival number of "1," the second data unit may be assigned an arrival number of "2," the third data unit may be assigned an arrival number of "3," and so forth. However, other implementations are possible.

In some implementations, a manifest record 210 may use a run-length reference format to represent a continuous range of data units (e.g., a portion of a data stream) that are indexed within a single container index 220. The run-length reference may be recorded in the unit address field and the length field of the manifest record 210. For example, the unit address field may indicate the arrival number of a first data unit in the data unit range being represented, and the length field may indicate a number N (where "N" is an integer) of data units, in the data unit range, that follow the data unit specified by arrival number in the unit address field. The data units in a data unit range may have consecutive arrival numbers (e.g., because they are consecutive in an ingested data stream). As such, a data unit range may be represented by an arrival number of a first data unit in the data unit range (e.g., specified in the unit address field of a manifest record 210) and a number N of further data units in the data unit range (e.g., specified in the length field of the manifest record 210). The further data units in the data unit range after the first data unit may be deterministically derived by calculating the N arrival numbers that sequentially follow the specified arrival number of the first data unit, where those N arrival numbers identify the further data units in the data unit range. In such examples, manifest record 210 may include an arrival number "X" in the unit address field and a number N in the length field, to indicate a data unit range including the data unit specified by arrival number X and the data units specified by arrival numbers X+i for i=0 through i=N, inclusive (where "i" is an integer). In this manner, the manifest record 210 may be used to identify all data units in the data unit range.

In one or more implementations, the data structures 200 may be used to retrieve stored deduplicated data. For example, a read request may specify an offset and length of data in a given file. These request parameters may be matched to the offset and length fields of a particular manifest record 210. The container index and unit address of the particular manifest record 210 may then be matched to a particular data unit record 230 included in a container index 220. Further, the entity identifier of the particular data unit record 230 may be matched to the entity identifier of a particular entity record 240. Furthermore, one or more other fields of the particular entity record 240 (e.g., the entity offset, the stored length, checksum, etc.) may be used to identify the container 250 and entity 260, and the data unit may then be read from the identified container 250 and entity 260.

In some implementations, each container index 220 may include a back-reference list 222. The back-reference list 222 may be a data structure to store a set of back-reference entries, where each back-reference entry specifies a different manifest 203 and at least one data unit range (e.g., a set of one or more data units that are included in the manifest 203 and that are indexed by the container index 220).

In some implementations, a back-reference entry (in back-reference list 222) may specify a data unit range as a run-length reference that identifies a first data unit and the length of the data unit range in the container index 220. For example, the run-length reference may identify the first data unit in the data unit range using a first arrival number "X" assigned to the first data unit in the container index 220. Further, the run-length reference may identify a length value N indicating the number of arrival numbers that sequentially follow the first arrival number "X," and that are assigned in the container index 220 to the remaining data units in the data unit range. In such examples, the run-length reference included in the back-reference entry may be used to identify the first data unit in the range (having the first arrival number "X"), and then identifying the remaining data units in the range (having the N arrival numbers that consecutively follow the first arrival number "X"). In this manner, the run-length reference included in the back-reference entry may be used to deterministically identify all data units in the data unit range.

In other implementations, the back-reference entry may specify a data unit range (including one or more data units) using other identifiers or representations. For example, the back-reference entry may specify a data unit range as a fingerprint of a single data unit, as a set of fingerprints for multiple data units, as a set of arrival numbers for multiple data units, as an offset (e.g., a byte distance from an end), as an offset and length, or the like.

In some implementations, upon initiating a housekeeping job to delete a backup item, a storage controller (e.g., storage controller 110 shown in FIG. 1) may load the item metadata 202 for the backup item into memory. The storage controller may use the item metadata 202 to identify a particular manifest 203 that represents the backup item, and to identify at least one container index 220 referenced by the identified manifest 203. The storage controller may load the identified container index 220 into memory, and may then access the back-reference list 222 included in the identified container index 220. Further, the storage controller may identify the back-reference entry (in the back-reference list 222) that specifies the particular manifest 203, and may read the data unit range information (e.g., a run-length reference) included in the identified back-reference entry. The storage controller may then decrement, in the container index 220, the reference counts that correspond to the data units identified by the data unit range information. In this manner, use of the back-reference list 222 in the container index 220 may allow the appropriate reference counts to be decremented for the housekeeping job, but without having to load the particular manifest 203 into memory to identify the one or more data units associated with those reference counts. Accordingly, some implementations may reduce the amount of I/O bandwidth used for housekeeping jobs, and may thereby improve the performance of the deduplication storage system.

In some implementations, each time that the container index 220 is generated or updated to include information regarding a particular manifest 203, the back-reference list 222 in that container index 220 is updated to identify that manifest 203 and at least one data unit range identifying the data units of the manifest 203 that are indexed by the container index 220. Further, when the container index 220 is no longer associated with a manifest 203, the back-reference entry for that manifest 203 may be removed from the back-reference list 222. An example implementation of the back-reference list 222 is described below with reference to FIGS. 5A-5E.

FIGS. 3A and 4A-4G—Example Processes for Generating a Work Map

Figure 3A:
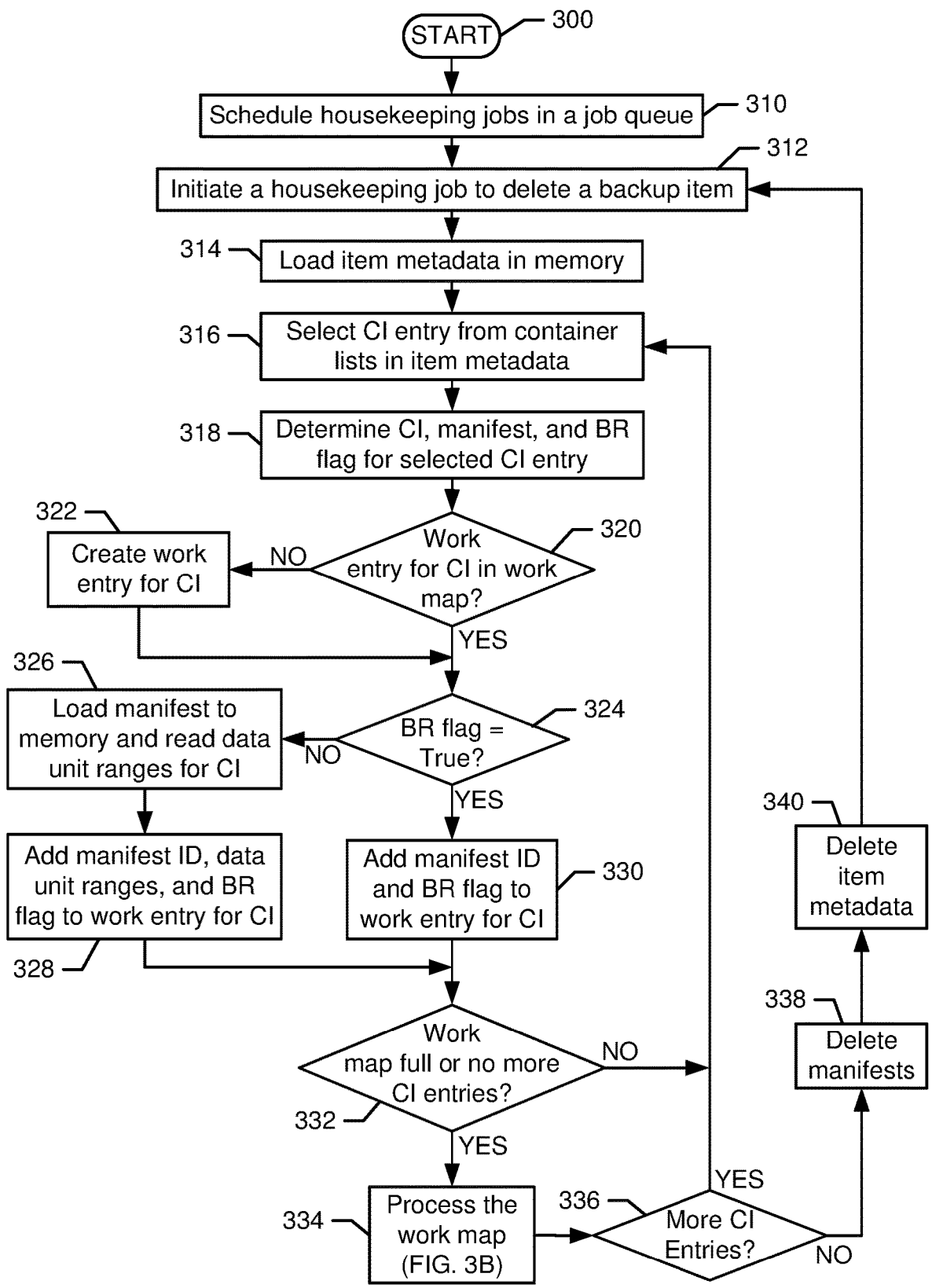
FIGS. 3A-3B are illustrations of example processes, in accordance with some implementations.

FIG. 3A shows is an example process 300 for generating a housekeeping work map, in accordance with some implementations. For the sake of illustration, details of the process 300 may be described below with reference to FIGS. 4A-4G, which show example operations in accordance with some implementations. However, other implementations are also possible. In some examples, the process 300 may be performed using the storage controller 110 (shown in FIG. 1). The process 300 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. In some implementations, the process 300 may be executed by a single processing thread. In other implementations, the process 300 may be executed by multiple processing threads in parallel (e.g., concurrently using the work map and executing multiple housekeeping jobs).

Block 310 may include scheduling housekeeping jobs in a job queue. Block 312 may include initiating a housekeeping job to delete a backup item stored in a deduplication storage system. For example, referring to FIG. 4A, the job queue 410 is a data structure to queue requests to delete backup items. The storage controller (e.g., storage controller 110 in FIG. 1) receives multiple deletion requests to delete backup items A-C stored in a deduplication storage system. In response to the received requests, the storage controller schedules multiple housekeeping jobs in a job queue 410 to delete the backup items A-C. The storage controller selects a housekeeping job from the job queue 410, and initiates the selected job to delete backup item A.

Block 314 may include loading item metadata in memory. For example, referring to FIGS. 1 and 4A-4B, the storage controller 110 loads the item A metadata 420 (i.e., item metadata for backup item A) from the persistent storage 140 to the memory 115. The item A metadata 420 including multiple manifest identifiers 422 and multiple container lists 425, where each container list 425 is associated with a different manifest identifier 422. Each container list 425 includes a set of CI entries. Each CI entry includes a CI identifier for each container index 160 that indexes data units included in the manifest 150 identified by the associated manifest identifier 422. Stated differently, each CI entry represents a different manifest-CI combination, namely a combination of the manifest 150 (identified by the manifest identifier 422) and the container index 160 (identified by the CI identifier in the CI entry). Further, each CI entry includes a back-reference flag ("BR Flag") indicating whether the manifest-CI combination (represented by the CI entry) is to be processed using the back-reference data structure included in the container index 160.

Block 316 may include selecting a container index (CI) entry from the container lists included in the item metadata. Block 318 may include determining the container index, the manifest, and the back-reference (BR) flag for the selected CI entry. For example, referring to FIG. 4B, the storage controller accesses the item A metadata 420 to read the manifest identifier MA-1 422 and the associated container list 425. Further, the storage controller reads a first CI entry (in the container list 425) that includes the container index identifier C-3. Further, the first CI entry includes a back-reference flag set to true ("T"), thereby indicating that the combination of manifest MA-1 and container index C-3 is to be processed using the back-reference data structure included in the container index C-3.

Decision block 320 may include determining whether the work map already includes a work entry associated with the identified container index (i.e., the container index identified in the CI entry selected at box 316). If so ("YES"), the process 300 may continue at decision block 324 (described below). Otherwise, if it is determined at decision block 320 that the work map does not include a work entry associated with the identified container index ("NO"), the process 300 may continue at block 322, including creating a new work entry work entry associated with the identified container index. For example, referring to FIG. 4B, the storage controller determines that the work map 430 does not include a work entry for container index C-3 (identified in the first CI entry of the container list 425). In response to this determination, the storage controller creates a new work entry for C-3 (i.e., a new work entry indexed to container index C-3) in the work map 430. In another example, referring to FIG. 4D, the storage controller determines that the work map 430 does not include a work entry for container index C-4 (identified in the second CI entry of the container list 425). In response to this determination, the storage controller creates a new work entry for C-4.

Decision block 324 may include determining whether the back-reference flag in the selected CI entry is set to a true value. If so ("YES"), the process 300 may continue at block 330, including adding the manifest identifier and back-reference flag to the work entry for the identified container index. For example, referring to FIG. 4C, the storage controller determines that the CI entry for C-3 includes a back-reference flag set to true ("T"). In response to this determination, the storage controller adds or inserts the manifest identifier "MA-1" and the back-reference flag "BR=T" to a first field ("Field1") of the work entry for C-3 (in the work map 430).

However, if it is determined at decision block 324 that the back-reference flag in the selected CI entry is not set to a true value ("NO"), the process 300 may continue at block 326, including loading the identified manifest to memory, and reading the identified manifest to determine the data unit range(s) for the identified container index. Block 328 may include adding the manifest identifier, address information for the data unit range(s), and the back-reference flag to the work entry for the identified container index. For example, referring to FIG. 4E, the storage controller determines that the CI entry for C-4 includes a back-reference flag set to false ("F"). In response to this determination, the storage controller loads the manifest MA-1 440 from the persistent storage 140 to the memory 115. The storage controller reads the manifest MA-1 440 to determine the data unit range R2 for reference counts to be decremented in the container index C-4. The storage controller then adds the manifest identifier "MA-1," data identifying the data unit range R-2, and the back-reference flag "BR=F" to a first field of the work entry for C-4. For example, the data identifying the data unit range R-2 may include one or more run-length reference(s), data unit fingerprint(s), data unit arrival number(s), or the like.

Decision block 332 may include determining whether the work map is full (e.g., has reached a maximum number of work entries) or there are no more CI entries remaining in the container lists of the item metadata. If not ("NO"), the process 300 may return to block 316 (e.g., to select another CI entry from the container lists of the item metadata). Otherwise, if it determined at decision block 332 that work map is full, or that there are no more CI entries remaining in the container lists, then the process 300 may continue at block 334, including processing the work map to complete at least a portion of the housekeeping job. An example expansion of block 334 (i.e., an example process for processing the work map) is described below with reference to FIGS. 3B and 5A-5E.

Figure 4A:
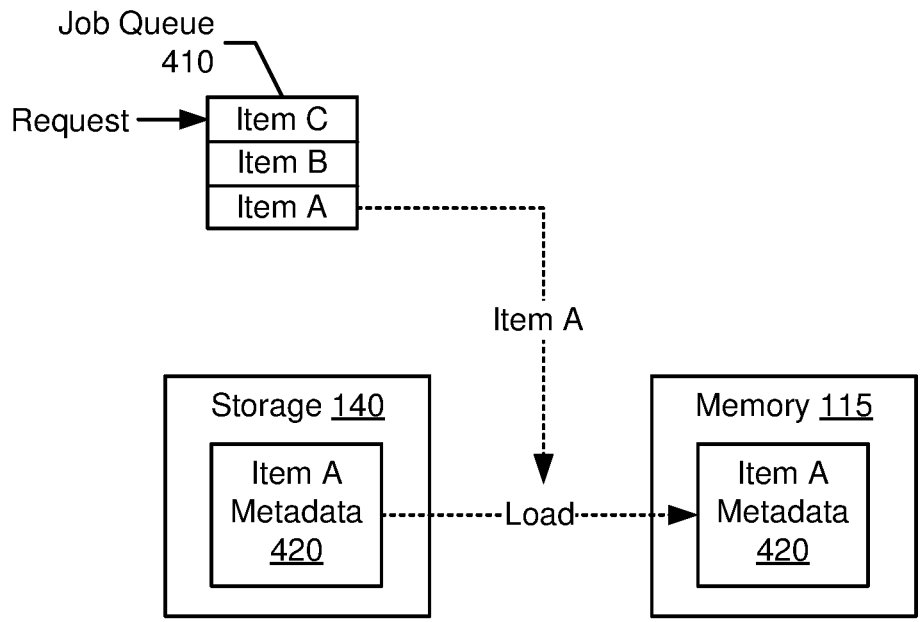
FIGS. 4A-4G are illustrations of example operations, in accordance with some implementations.
Figure 4B:
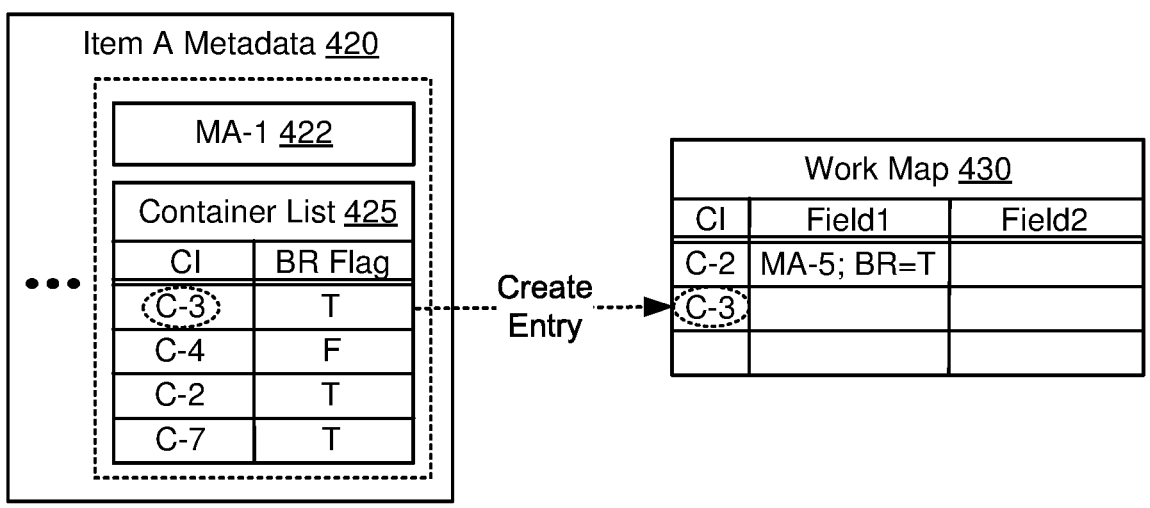
Figure 4C:
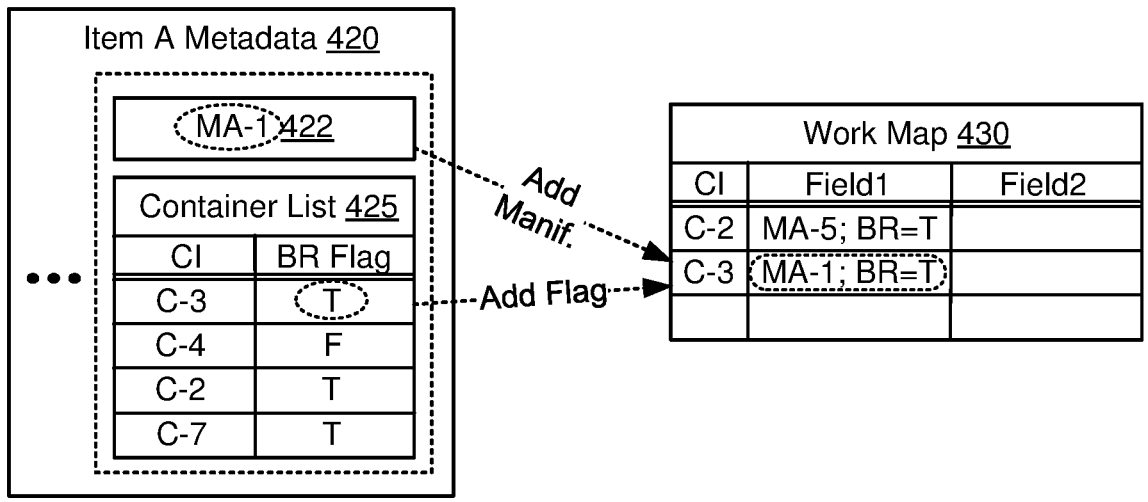
Figure 4D:
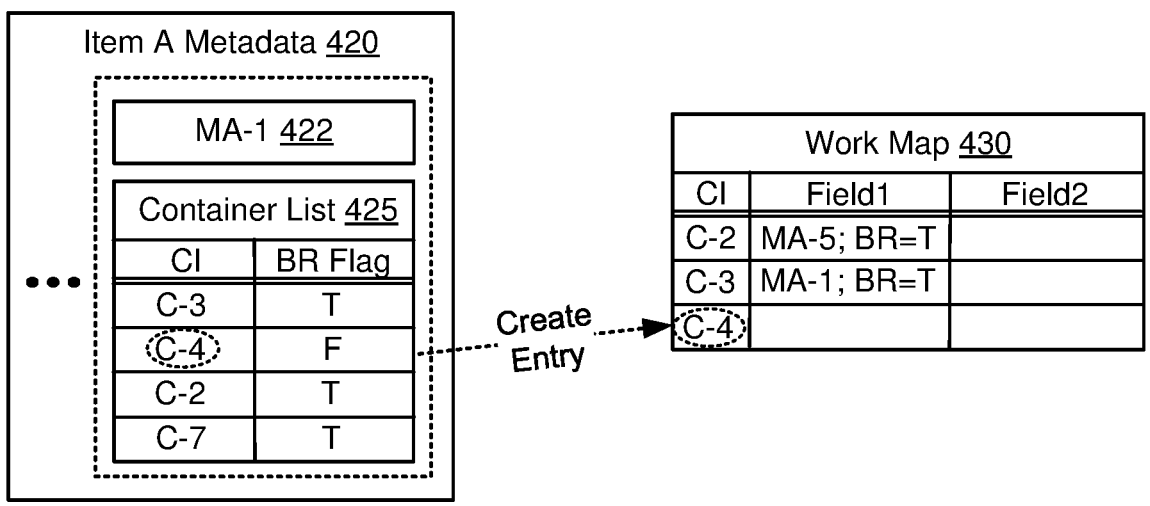
Figure 4E:
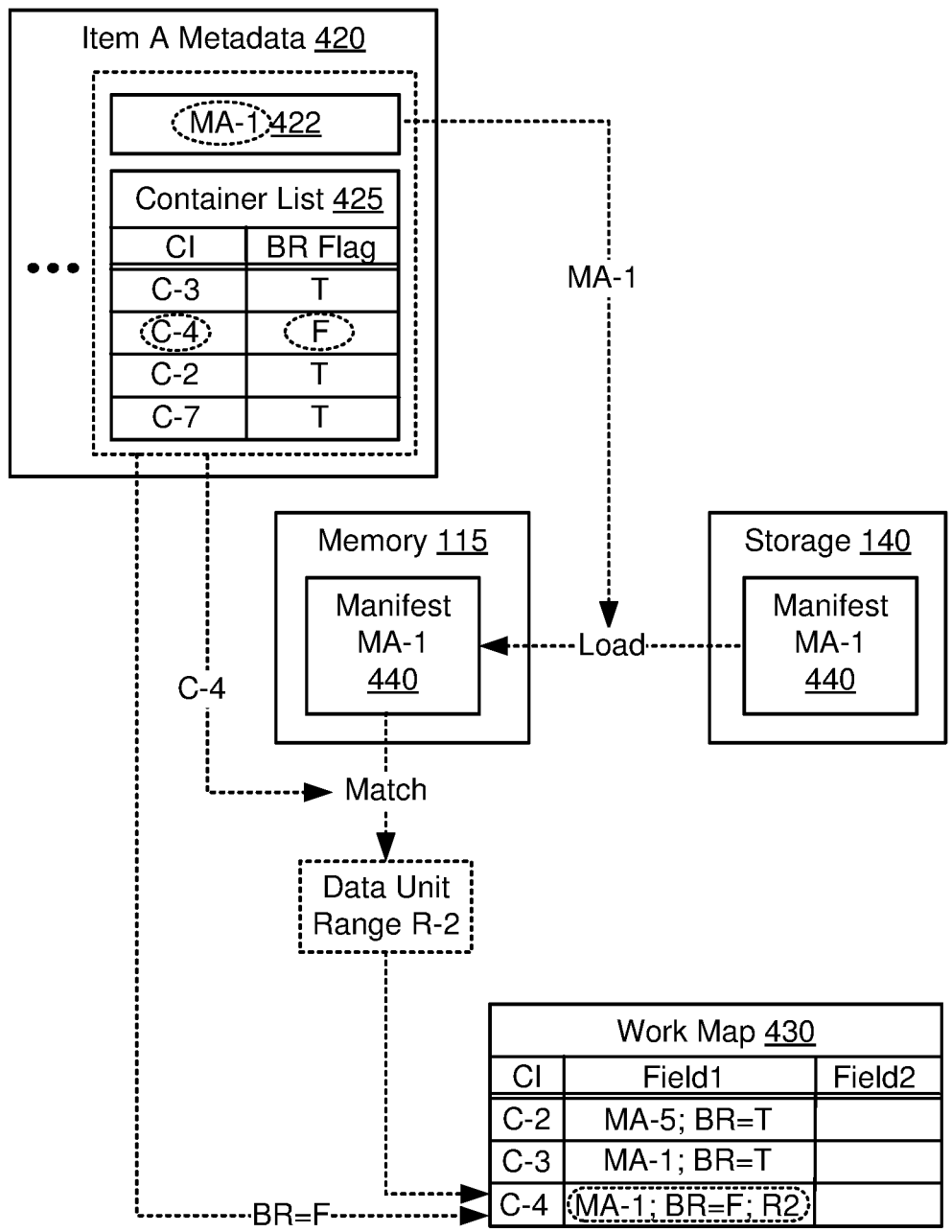
Figure 4F:
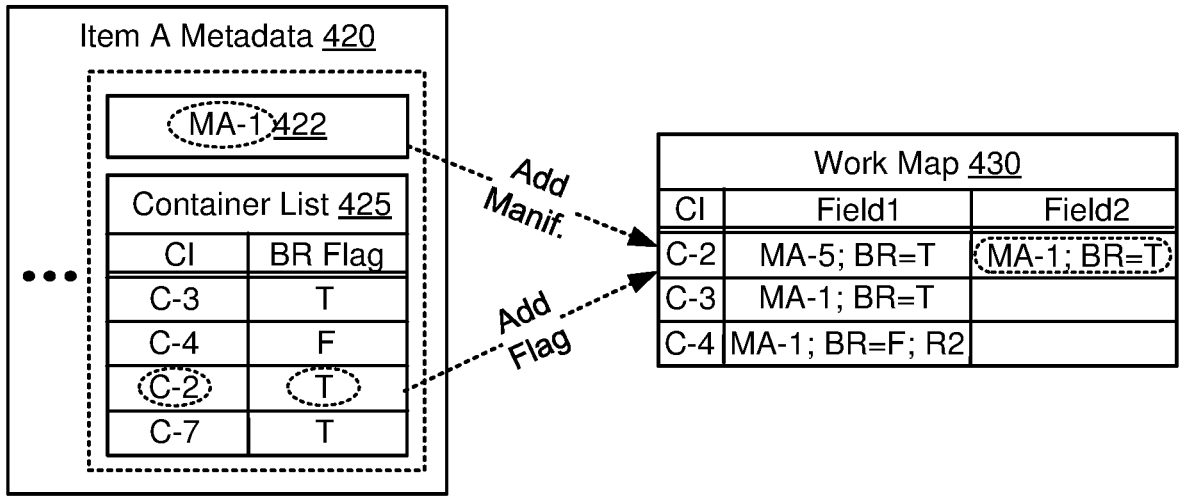
Figure 4G:
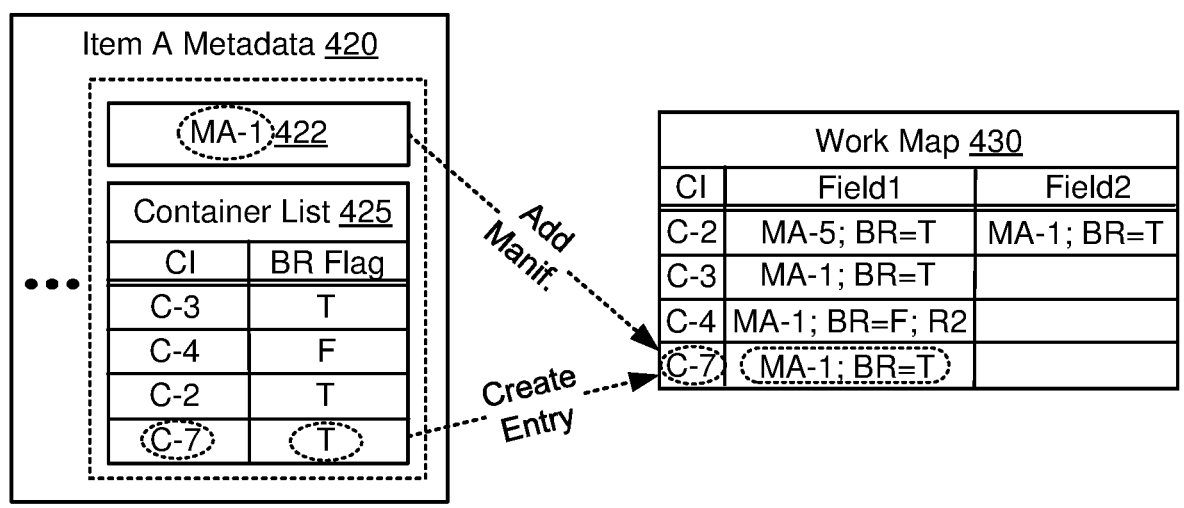

For example, referring to FIG. 4F, after creating work entries for container indexes C-3 and C-4, the storage controller determines that the work map 430 already includes a work entry for container index C-2 (identified in the third CI entry of the container list 425). In response to this determination, the storage controller adds the manifest identifier "MA-1" and the back-reference flag "BR=T" to a second field ("Field2") of the existing work entry for C-2. In another example, referring to FIG. 4G, the storage controller determines that the work map 430 does not include a work entry for container index C-7 (identified in the fourth CI entry of the container list 425). In response to this determination, the storage controller creates a new work entry for C-7, and adds the manifest identifier "MA-1" and the back-reference flag "BR=T" (i.e., a true value) to a first field ("Field2") of the new work entry for C-7.

Referring again to FIG. 3A, after processing the work map (at block 334), the process 300 may continue at decision block 336, including determining whether there are more CI entries remaining in the container lists of the item metadata. If so ("YES"), the process 300 may return to block 316 (e.g., to select another CI entry from the container lists of the item metadata). Otherwise, if it is determined at decision block 336 that there are no more CI entries remaining in the container lists ("NO"), then the process 300 may continue at block 338, including deleting the manifests identified in the item metadata. Block 340 may include deleting the item metadata. After block 340, the process 300 may return to block 312 (e.g., to initiate another housekeeping job to delete another backup item). For example, referring to FIGS. 1 and 4G, the storage controller 110 deletes each manifest 150 identified in the item A metadata 420 from the persistent storage 140 and the memory 115. Further, the storage controller 110 deletes the item A metadata 420 from persistent storage 140 and memory 115.

FIGS. 3B and 5A-5E—Example Processes for Processing a Work Map

Figure 3B:
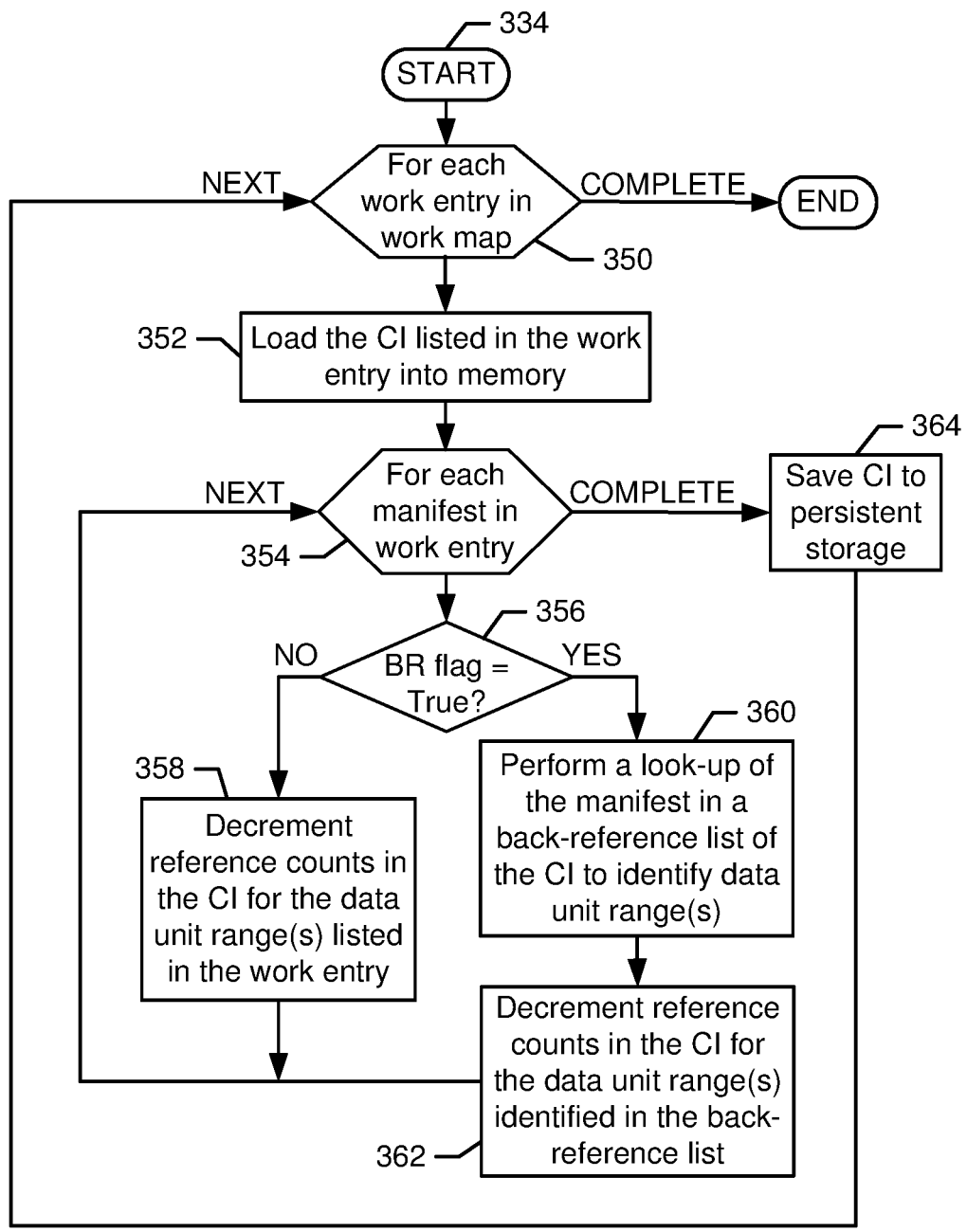

FIG. 3B shows is an example process 334 for processing a housekeeping work map, in accordance with some implementations. The process 334 may illustrate an example expansion of block 334 (shown in FIG. 3A). Accordingly, in some implementations, the process 334 may be performed after a determination that a work map is full or there are no more CI entries remaining in the container lists of the item metadata (at decision block 332 in FIG. 3A).

For the sake of illustration, details of the process 334 may be described below with reference to FIGS. 1 and 5A-5E. However, other implementations are also possible. In some examples, the process 334 may be performed using the storage controller 110 (shown in FIG. 1). The process 334 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. In some implementations, the process 334 may be executed by a single processing thread. In other implementations, the process 334 may be executed by multiple processing threads in parallel.

At block 350, an outer loop (defined by blocks 350-354) may be entered to process each work entry in a housekeeping work map. Block 352 may include loading the container index identified in the current work entry into memory. For example, referring to FIG. 5A, the storage controller (e.g., storage controller 110 in FIG. 1) iterates through the work entries of the work map 420. The storage controller selects a first work entry of work map 420, and reads an identifier for container index C-2. The storage controller then causes the container index C-2 510A to be loaded from the persistent storage 140 into the memory 115.

At block 354, an inner loop (defined by blocks 354-362) may be entered to process each manifest identified in the current work entry (i.e., the work entry being processed in the current iteration of the outer loop). Decision block 356 may include determining whether the back-reference flag associated with the current manifest is set to a true value. If so ("YES"), the process 334 may continue at block 360, including performing a look-up of the identified manifest in a back-reference list of the loaded container index to identify data unit range(s). Block 362 may include decrementing the reference counts in the loaded container index for the data unit range(s) identified in the back-reference list. After block 362, the process 334 may return to block 354 to perform another iteration of the inner loop (e.g., to process another manifest in the work entry). Further, after all iterations of the inner loop are completed (e.g., all manifests in the current work entry have been processed), the process 334 may continue at block 364, including saving the container index to persistent storage. After block 364, the process 334 may return to block 350 to perform another iteration of the outer loop (e.g., to process another work entry included in the work map).

Figure 5A:
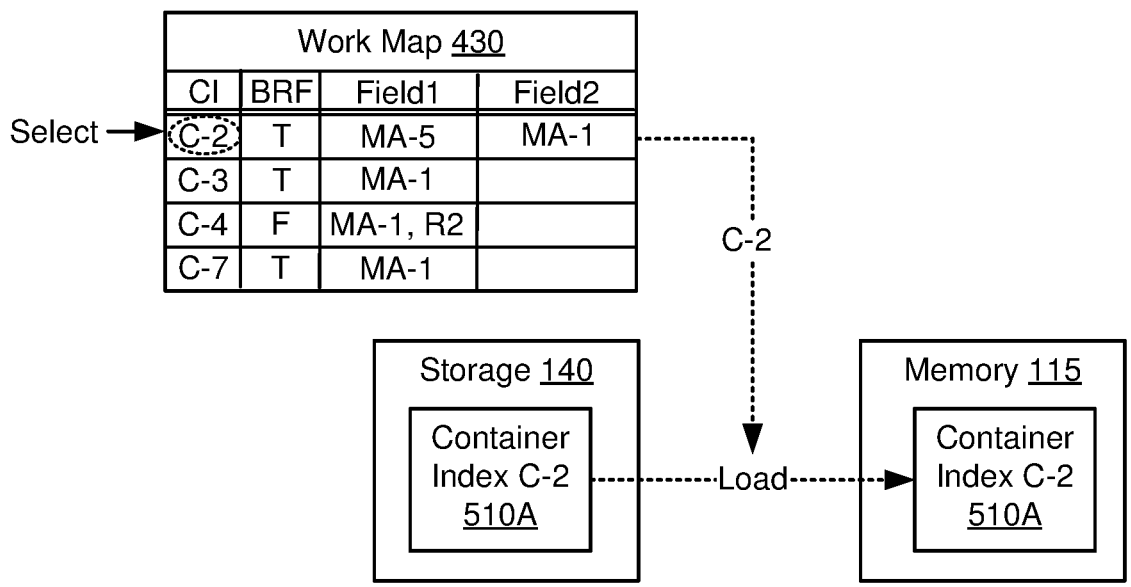
FIGS. 5A-5E are illustrations of example operations, in accordance with some implementations.
Figure 5B:
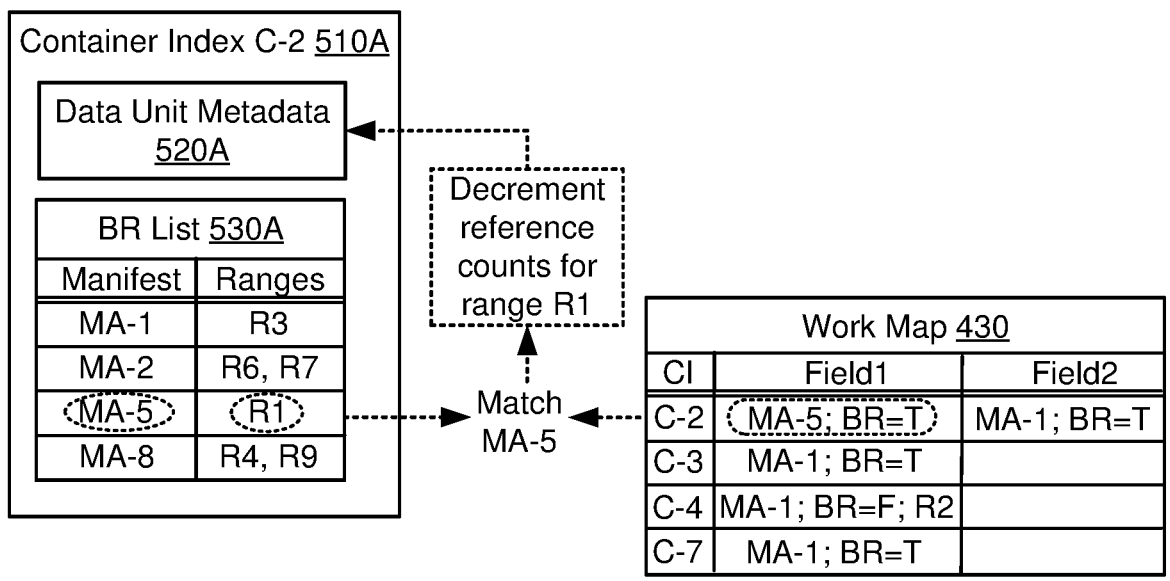

For example, referring to FIG. 5B, the storage controller reads the first field ("Field1") in the first work entry (for container index C-2), and thereby obtains the manifest identifier "MA-5" and the back-reference flag "BR=T" (i.e., a true value). The storage controller matches the manifest identifier "MA-5" to the third back-reference entry in the back-reference list 530A of the container index C-2 510A, and reads data range information in the third back-reference entry to identify the data unit range R1. The storage controller identifies the reference counts (in the data unit metadata 520A of the container index C-2 510A) that correspond to the data units included in the data unit range R1. The storage controller then decrements the identified reference counts for the data units in the data unit range R1. In some examples, the data range information included in the back-reference list 530A may be specified as a run-length reference. In such examples, the storage controller reads the run-length reference (in the back-reference entry) to identify the first data unit in the data unit range R1 (e.g., having a first arrival number "X"), and to then identify the remaining data units in the data unit range R1 (e.g., having the N arrival numbers that consecutively follow the first arrival number "X"). In this manner, the storage controller uses the run-length reference in the back-reference entry to identify all data units in the data unit range R1, and then decrements the reference counts (in the data unit metadata 520A of the container index C-2 510A) that correspond to the identified data units in the data unit range R1. In this manner, the back-reference list 530A in the container index C-2 510A may be used to decrement the appropriate reference counts for the housekeeping job, but without having to load the manifest "MA-5" into memory to identify the data units associated with those reference counts.

Figure 5C:
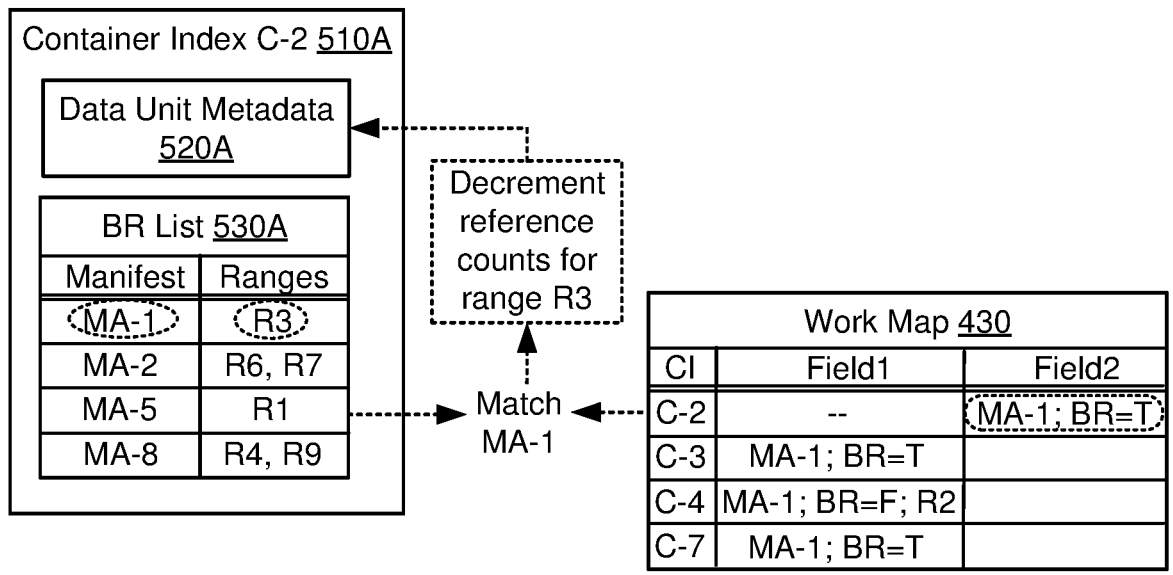
Figure 5D:
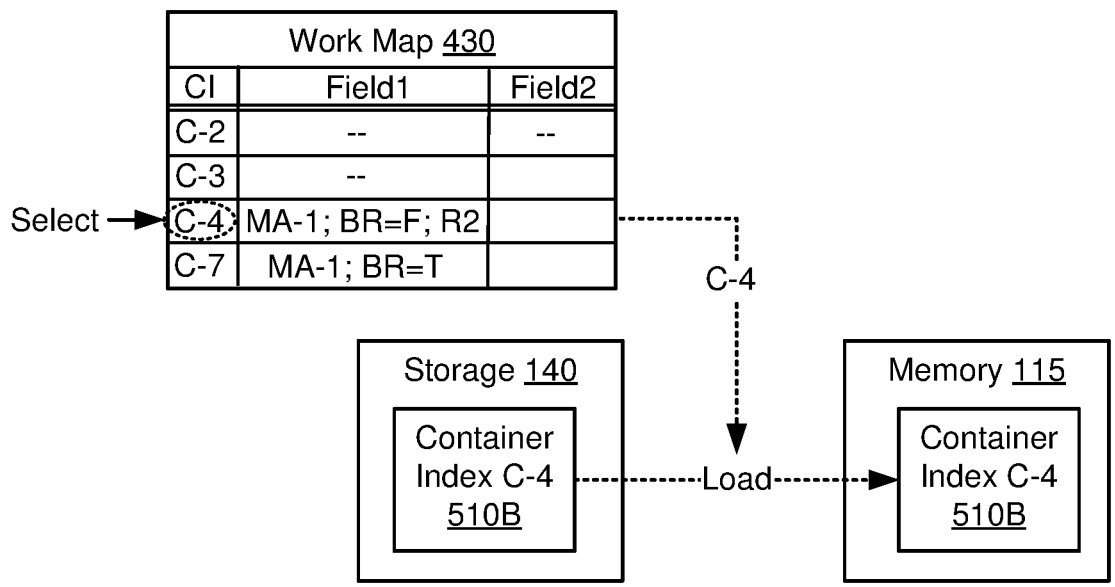
Figure 5E:
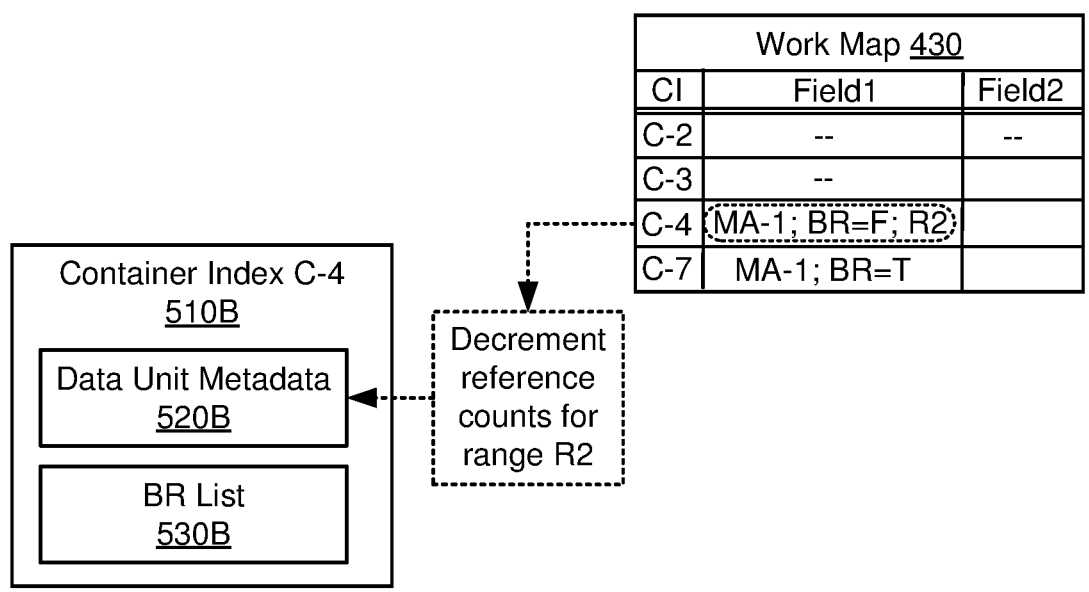

In another example, referring to FIG. 5C, the storage controller reads the second field ("Field2") in the first work entry (for container index C-2), and thereby obtains the manifest identifier "MA-1" and the back-reference flag "BR=T." The storage controller matches the manifest identifier "MA-1" to the first back-reference entry in the back-reference list 530A, and thereby obtains the data unit range R3. The storage controller then decrements the reference counts (in the data unit metadata 520A of the container index C-2 510A) for the data units represented by the data unit range R3. Further, after processing the first and second fields of the first work entry (for container index C-2), the storage controller saves the container index C-2 510A to persistent storage, and then selects the second work entry (for container index C-3) of work map 420 to be processed.

Referring again to FIG. 3B, if it is determined at decision block 356 that the back-reference flag associated with the current manifest is not set to a true value ("NO"), the process 334 may continue at block 358, including decrementing the reference counts in the identified container index for the data unit range(s) listed in the current work entry. After block 358, the process 334 may return to block 354 to perform another iteration of the inner loop (e.g., to process another manifest in the work entry). For example, referring to FIG. 5D, the work map 430 is illustrated to represent a state after the first work entry (for container index C-2) and second work entry (for container index C-3) have been processed and completed. The storage controller selects the next work entry (i.e., the third entry) of work map 420, and reads an identifier for container index C-4. The storage controller then causes the container index C-4 510B to be loaded from the persistent storage 140 into the memory 115. Further, referring to FIG. 5E, the storage controller reads the first field in the third work entry (for container index C-4), and thereby obtains the manifest identifier "MA-1," the back-reference flag "BR=F" (i.e., a false value), and the data unit range R2 (e.g., stored at box 328 of FIG. 3A). The storage controller then decrements the reference counts (in the data unit metadata 520B of the container index C-4 510B) for the data units represented by the data unit range R2.

Referring again to FIG. 3B, after all iterations of the outer loop are completed (e.g., all work entries in the work map have been processed), the process 334 may be completed. For example, referring to FIG. 3A, the storage controller may resume the process 300 at decision block 336, including determining whether there are more CI entries remaining in the container lists of the item metadata, and if so, selecting another CI entry to be processed by using the work map 120.

Figure 6:
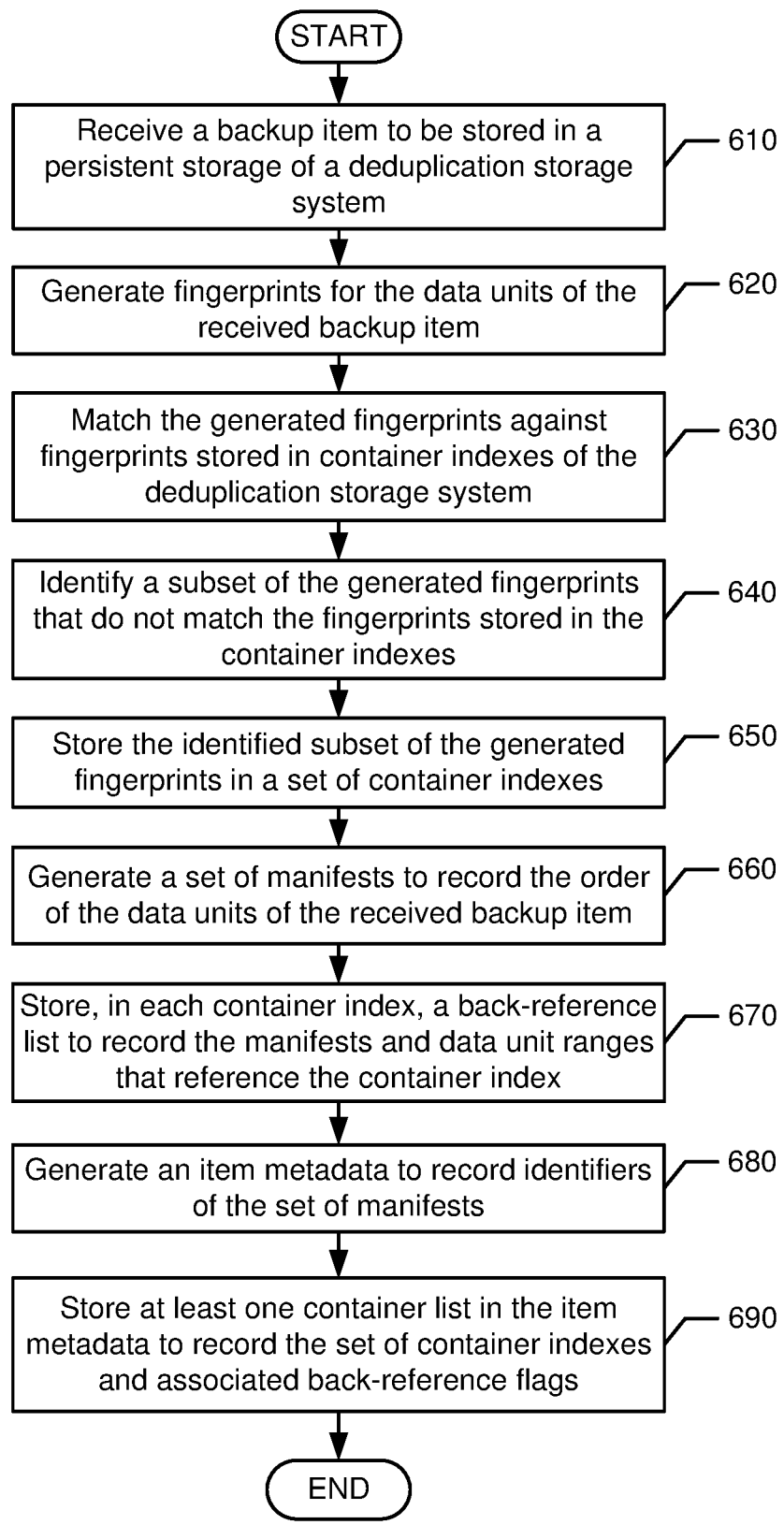
FIG. 6 is an illustration of an example process, in accordance with some implementations.

FIG. 6—Example Process for Generating Metadata

FIG. 6 shows is an example process 600 for generating metadata, in accordance with some implementations. For the sake of illustration, details of the process 600 may be described below with reference to FIGS. 1 and 4A-5E, which show examples in accordance with some implementations. However, other implementations are also possible. In some examples, the process 500 may be performed using the storage controller 110 (shown in FIG. 1). The process 600 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 610 may include receiving a backup item to be stored in a persistent storage of a deduplication storage system. Block 620 may include generating fingerprints for the data units of the received backup item. For example, referring to FIG. 1, the storage controller 110 receives a backup item (e.g., data stream 105) to be stored in the deduplication storage system 100, and generates fingerprints for the data units in the received backup item.

Block 630 may include matching the generated fingerprints against fingerprints stored in container indexes of the deduplication storage system. Block 640 may include identifying a subset of the generated fingerprints that do not match the fingerprints stored in the container indexes. Block 650 may include storing the identified subset of the generated fingerprints in a set of container indexes. For example, referring to FIG. 1, the storage controller 110 compares the generated fingerprints to the fingerprints included in container indexes 160. If a match is identified for a data unit, then the storage controller 110 determines that a duplicate of the data unit is already stored by the storage system 100. In response to this determination, the storage controller 110 stores a reference to the previous data unit (e.g., in a manifest 150) in deduplicated form. Otherwise, if a match is not identified for a data unit, then the storage controller 110 stores the data unit is a data container 170, and adds an entry for the data unit to a container index 160 corresponding to that data container 170.

Block 660 may include generating a set of manifests to record the order of the data units of the received backup item. Block 670 may include storing, in each container index, a back-reference list to record the manifests and data unit ranges that reference the container index. For example, referring to FIGS. 1 and 5A, the storage controller 110 records the order in which data units are received in one or more manifests 150. Further, the storage controller 110 generates the back-reference list 445 in the container index C-2 440. The back-reference list 445 identifies each manifest 150 (e.g., MA-1) that currently references the container index C-2 400. Further, the back-reference list 445 may also identify, for each identified manifest 150, at least one data unit range representing the set of data units that are included in the manifest 150 and that are indexed by the container index C-2 400. In some implementations, the storage controller 110 may continually update the manifest list 445 during operation (e.g., to reflect deletions or additions of manifests to the manifest list 445 during changes to the data stored in storage system 100).

Block 680 may include generating an item metadata to record identifiers of the set of manifests. Block 690 may include storing at least one container list in the item metadata to record the set of container indexes and associated back-reference flags. After block 690, the process 600 may be completed. For example, referring to FIGS. 1 and 4B, the storage controller 110 generates item A metadata 420 to represent backup item A. The item A metadata 420 includes multiple manifest identifiers 422 and multiple container lists 425, where each container list 425 is associated with a different manifest identifier 422. Each container list 425 includes a set of CI entries. Each CI entry includes a CI identifier for each container index 160 that indexes data units included in the manifest 150 identified by the associated manifest identifier 422. Further, each CI entry includes a back-reference flag indicating whether the manifest-CI combination (represented by the CI entry) is to be processed using the back-reference data structure included in the container index 160.

Figure 7:
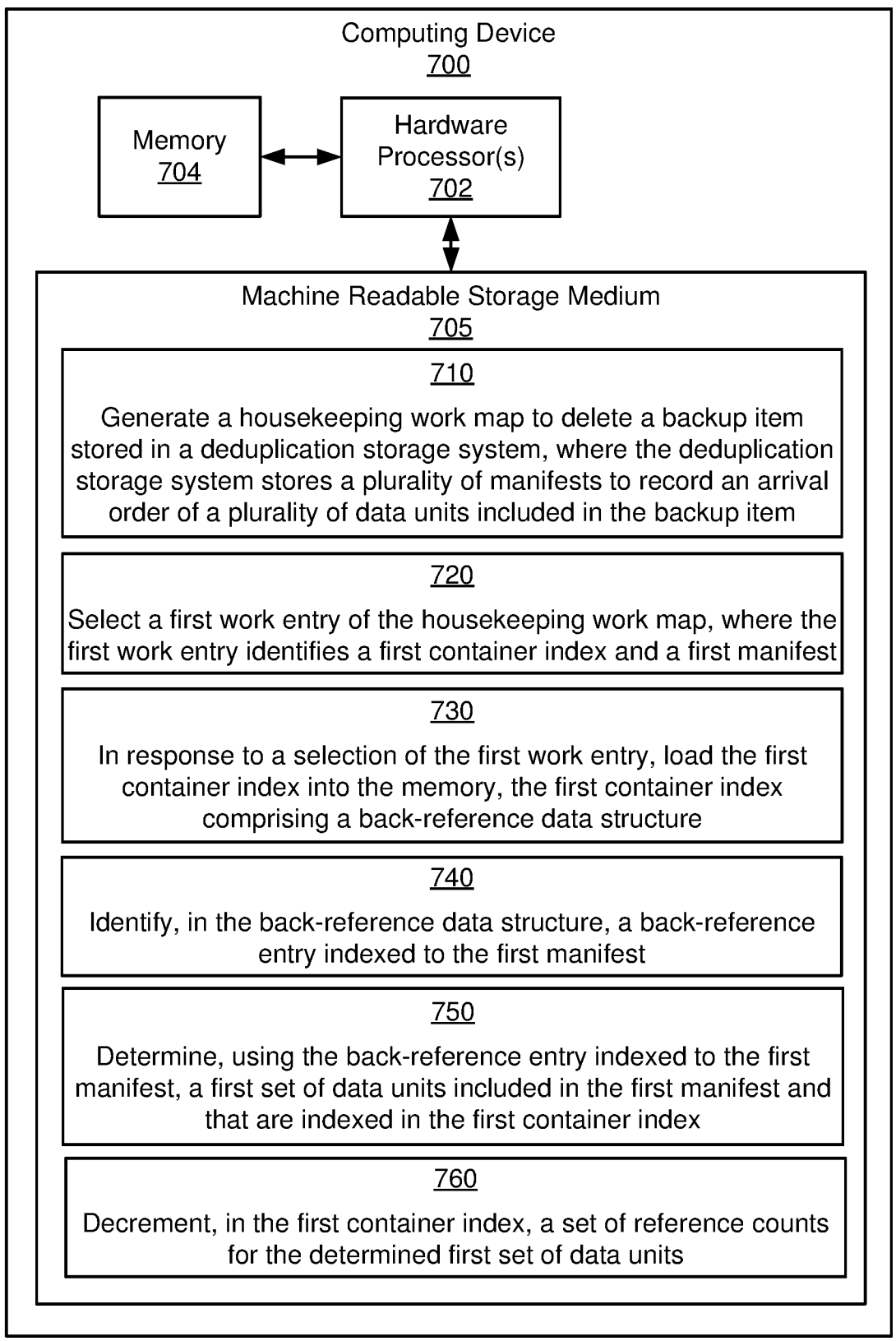
FIG. 7 is a schematic diagram of an example computing device, in accordance with some implementations.

FIG. 7—Example Computing Device

FIG. 7 shows a schematic diagram of an example computing device 700. In some examples, the computing device 600 may correspond generally to some or all of the storage system 100 (shown in FIG. 1). As shown, the computing device 700 may include a hardware processor 702, a memory 704, and machine-readable storage 705 including instructions 710-760. The machine-readable storage 705 may be a non-transitory medium. The instructions 710-760 may be executed by the hardware processor 702, or by a processing engine included in hardware processor 702.

Instruction 710 may be executed to generate a housekeeping work map to delete a backup item stored in a deduplication storage system, where the deduplication storage system stores a plurality of manifests to record an arrival order of a plurality of data units included in the backup item. For example, referring to FIGS. 1 and 4A-4G, the storage controller 110 selects a housekeeping job from the job queue 410, and initiates the selected job to delete backup item A. The storage controller 110 loads the item A metadata 420 into memory 115, and reads the manifest identifiers and the associated container lists. The storage controller 110 populates the work entries of the work map 430 based on the item A metadata 420. For entries in a container list that include a back-reference flag set to a "true" value, the storage controller 110 adds the manifest identifier and the back-reference flag to the work entry. Further, for entries in a container list that include a back-reference flag set to a "false" value, the storage controller 110 loads the identified manifest 150 into memory 115, determines at least one data unit range based on the manifest 150, and then adds the manifest identifier, the back-reference flag, and the at least one data unit range to the work entry.

Instruction 720 may be executed to select a first work entry of the housekeeping work map, where the first work entry identifies a first container index and a first manifest. Instruction 730 may be executed to executed to, in response to a selection of the first work entry, load the first container index into the memory, the first container index comprising a back-reference data structure. For example, referring to FIGS. 1 and 4A-4G, the storage controller 110 processes the work map 420 by iterating through the work entries. The storage controller 110 selects a first work entry of work map 420, and reads an identifier for container index C-2. Further, the storage controller 110 causes the container index C-2 510A to be loaded from the persistent storage 140 into the memory 115. The container index C-2 510A includes the back-reference list 530A.

Instruction 740 may be executed to identify, in the back-reference data structure, a back-reference entry indexed to the first manifest. Instruction 750 may be executed to determine, using the back-reference entry indexed to the first manifest, a first set of data units included in the first manifest and that are indexed in the first container index. Instruction 760 may be executed to decrement, in the first container index, a set of reference counts for the determined first set of data units.

For example, referring to FIGS. 1 and 4A-4G, the storage controller 110 reads the first field in the first work entry (for C-2), and thereby obtains the manifest identifier "MA-5" and a back-reference flag set to a true value. The storage controller 110 matches the manifest identifier "MA-5" to the third back-reference entry in the back-reference list 530A of the container index C-2 510A, and thereby obtains the data unit range R1. The storage controller 110 then decrements the reference counts (in the data unit metadata 520A of the container index C-2 510A) for the data units represented by the data unit range R1. The storage controller 110 then decrements the reference counts (in the data unit metadata 520A of the container index C-2 510A) for the data units represented by the data unit range R1. In another example, the storage controller 110 selects the third work entry (for C-4). Further, the storage controller 110 reads the first field in the third work entry, and thereby obtains the manifest identifier "MA-1," a back-reference flag set to a false value, and the data unit range R2. The storage controller 110 then decrements the reference counts (in the data unit metadata 520B of the container index C-4 510B) for the data units represented by the data unit range R2.

Figure 8:
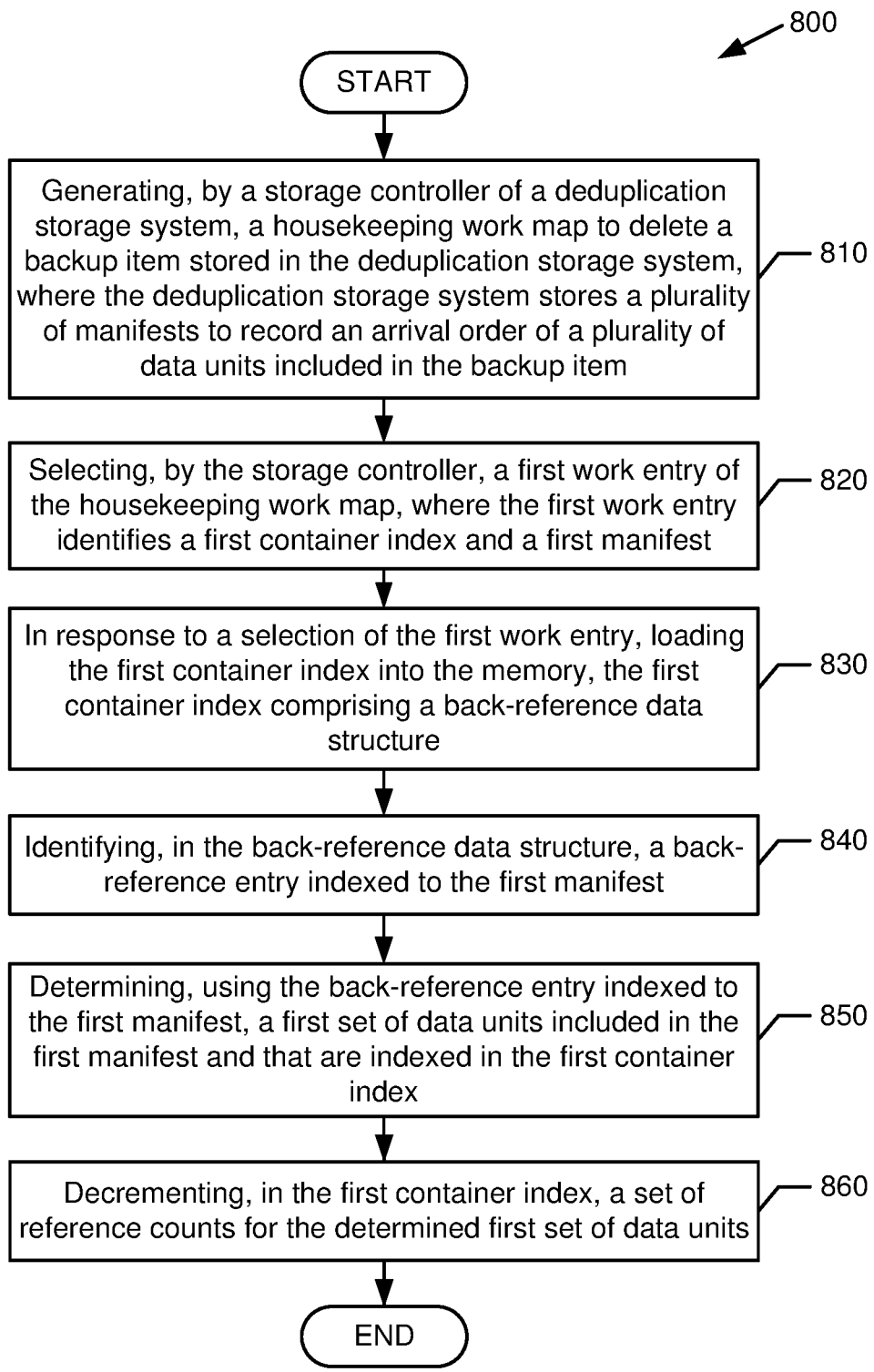
FIG. 8 is an illustration of an example process, in accordance with some implementations.

FIG. 8—Example Process for Housekeeping

FIG. 8 shows is an example process 800 for housekeeping, in accordance with some implementations. In some examples, the process 800 may be performed using the storage controller 110 (shown in FIG. 1). The process 800 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 810 may include generating, by a storage controller of a deduplication storage system, a housekeeping work map to delete a backup item stored in the deduplication storage system, where the deduplication storage system stores a plurality of manifests to record an arrival order of a plurality of data units included in the backup item. Block 820 may include selecting, by the storage controller, a first work entry of the housekeeping work map, where the first work entry identifies a first container index and a first manifest.

Block 830 may include, in response to a selection of the first work entry, loading the first container index into the memory, the first container index comprising a back-reference data structure. Block 840 may include identifying, in the back-reference data structure, a back-reference entry indexed to the first manifest. Block 850 may include determining, using the back-reference entry indexed to the first manifest, a first set of data units included in the first manifest and that are indexed in the first container index. Block 860 may include decrementing, in the first container index, a set of reference counts for the determined first set of data units.

FIG. 9—Example Machine-Readable Medium

FIG. 9 shows a machine-readable medium 900 storing instructions 910-960, in accordance with some implementations. The instructions 910-960 can be executed by a single processor, multiple processors, a single processing engine, multiple processing engines, and so forth. The machine-readable medium 900 may be a non-transitory storage medium, such as an optical, semiconductor, or magnetic storage medium.

Instruction 910 may be executed to generate a housekeeping work map to delete a backup item stored in a deduplication storage system, where the deduplication storage system stores a plurality of manifests to record an arrival order of a plurality of data units included in the backup item. Instruction 920 may be executed to select a first work entry of the housekeeping work map, where the first work entry identifies a first container index and a first manifest. Instruction 930 may be executed to, in response to a selection of the first work entry, load the first container index into the memory, the first container index comprising a back-reference data structure. Instruction 940 may be executed to identify, in the back-reference data structure, a back-reference entry indexed to the first manifest. Instruction 950 may be executed to determine, using the back-reference entry indexed to the first manifest, a first set of data units included in the first manifest and that are indexed in the first container index. Instruction 960 may be executed to decrement, in the first container index, a set of reference counts for the determined first set of data units.

In accordance with some implementations of the present disclosure, a controller of a deduplication storage system may generate a housekeeping work map for performing a housekeeping job. The controller may select a work entry for processing, and may load the container index identified in the work entry from persistent storage to memory. The controller may read a back-reference data structure included in the container index. Each entry of the back-reference data structure may specify a different manifest and a data unit range. The data unit range may identify a set of data units that are included in the specified manifest and that are indexed by the container index. The controller may select the back-reference entry that specifies the same manifest that is identified in the work entry, and may extract the data unit range specified in the selected back-reference entry. The controller may then decrement, in the container index, the reference counts that correspond to the extracted data unit range. In this manner, the work entry may be processed without loading the manifest into memory. Accordingly, some implementations may reduce the amount of I/O bandwidth used for housekeeping jobs, and may thereby improve the performance of the storage system.

Note that, while FIGS. 1-9 show various examples, implementations are not limited in this regard. For example, referring to FIG. 1, it is contemplated that the storage system 100 may include additional devices and/or components, fewer components, different components, different arrangements, and so forth. In another example, it is contemplated that the functionality of the storage controller 110 described above may be included in any another engine or software of storage system 100. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computing device comprising:
a processor;
a memory; and
a machine-readable storage storing instructions, the instructions executable by the processor to:
  generate a housekeeping work map to delete a backup item stored in a deduplication storage system, wherein the deduplication storage system stores a plurality of manifests to record an arrival order of a plurality of data units included in the backup item;
  select a first work entry of the housekeeping work map, wherein the first work entry identifies a first container index and a first manifest;
  in response to a selection of the first work entry, load the first container index into the memory, the first container index comprising a back-reference data structure;
  identify, in the back-reference data structure, a back-reference entry indexed to the first manifest;
  determine, using the back-reference entry indexed to the first manifest, a first set of data units included in the first manifest and that are indexed in the first container index; and
  decrement, in the first container index, a set of reference counts for the determined first set of data units.

2. The computing device of claim 1, including instructions executable by the processor to:
  determine whether a first flag included in the first work entry indicates that a combination of the first container index and the first manifest is to be processed using the back-reference data structure; and identify, in the back-reference data structure, the back-reference entry indexed to the first manifest in response to a determination that the first flag indicates that the combination of the first container index and the first manifest is to be processed using the back-reference data structure.

3. The computing device of claim 2, including instructions executable by the processor to:
select a second work entry of the housekeeping work map, wherein the second work entry identifies a second container index and a second manifest;
determine whether a second flag included in the second work entry indicates that a combination of the second container index and the second manifest is to be processed using a second back-reference data structure in the second container index;
in response to a determination that the second flag does not indicate that the combination of the second container index and the second manifest is to be processed using the second back-reference data structure in the second container index:
determine, based on data unit range information included in the second work entry, a second set of data units included in the second manifest and that are indexed in the second container index; and
decrement, in the second container index, a second set of reference counts for the determined second set of data units.

4. The computing device of claim 1, including instructions executable by the processor to:
initiate a housekeeping job to delete the backup item;
identify a set of container indexes affected by the housekeeping job, wherein the set of container indexes includes a third container index, and wherein the first manifest references the third container index;
determine whether the housekeeping work map includes an existing work entry that identifies the third container index; and
in response to a determination that the housekeeping work map includes the existing work entry that identifies the third container index, add the identifier of the first manifest to the existing work entry.

5. The computing device of claim 4, including instructions executable by the processor to:
determine, based on item metadata that represents the backup item, whether a combination of the third container index and the first manifest is to be processed using a third back-reference data structure in the third container index;
in response to a determination that the combination of the third container index and the first manifest is not to be processed using the third back-reference data structure:
load the first manifest from a persistent storage into the memory;
determine, based on the first manifest loaded in the memory, a first data unit range that identifies a third set of data units included in the first manifest and that are indexed in the third container index; and
add an indication of the first data unit range to the existing work entry.

6. The computing device of claim 5, including instructions executable by the processor to:
in response to a determination that the combination of the third container index and the first manifest is not to be processed using the third back-reference data structure, add a third flag to the existing work entry, the third flag to indicate that the combination of the third container index and the first manifest is not to be processed using the third back-reference data structure.

7. The computing device of claim 5, including instructions executable by the processor to:
in response to a determination that the combination of the third container index and the first manifest is to be processed using the third back-reference data structure, add a fourth flag to the existing work entry, the fourth flag to indicate that the combination of the third container index and the first manifest is to be processed using the third back-reference data structure.

8. The computing device of claim 4, including instructions executable by the processor to:
in response to a determination that the housekeeping work map does not include the existing work entry that identifies the third container index:
generate a new work entry that identifies the third container index in the housekeeping work map; and
add an identifier of the first manifest to the new work entry.

9. A method comprising:
generating, by a storage controller of a deduplication storage system, a housekeeping work map to delete a backup item stored in a deduplication storage system, wherein the deduplication storage system stores a plurality of manifests to record an arrival order of a plurality of data units included in the backup item;
selecting, by the storage controller, a first work entry of the housekeeping work map, wherein the first work entry identifies a first container index and a first manifest;
in response to a selection of the first work entry, loading the first container index into the memory, the first container index comprising a back-reference data structure;
identifying, in the back-reference data structure, a back-reference entry indexed to the first manifest;
determining, using the back-reference entry indexed to the first manifest, a first set of data units included in the first manifest and that are indexed in the first container index; and
decrementing, in the first container index, a set of reference counts for the determined first set of data units.

10. The method of claim 9, comprising:
determining whether a first flag included in the first work entry indicates that a combination of the first container index and the first manifest is to be processed using the back-reference data structure; and
identifying, in the back-reference data structure, the back-reference entry indexed to the first manifest in response to a determination that the first flag indicates that the combination of the first container index and the first manifest is to be processed using the back-reference data structure.

11. The method of claim 10, comprising:
selecting a second work entry of the housekeeping work map, wherein the second work entry identifies a second container index and a second manifest;
determining whether a second flag included in the second work entry indicates that a combination of the second container index and the second manifest is to be processed using a second back-reference data structure in the second container index;
in response to a determination that the second flag does not indicate that the combination of the second container index and the second manifest is to be processed using the second back-reference data structure in the second container index:
  determining, based on data unit range information included in the second work entry, a second set of data units included in the second manifest and that are indexed in the second container index; and
  decrementing, in the second container index, a second set of reference counts for the determined second set of data units.

12. The method of claim 9, comprising:
initiating a housekeeping job to delete the backup item;
identifying a set of container indexes affected by the housekeeping job, wherein the set of container indexes includes a third container index, and wherein the first manifest references the third container index;
determining whether the housekeeping work map includes an existing work entry that identifies the third container index; and
in response to a determination that the housekeeping work map includes the existing work entry that identifies the third container index, adding the identifier of the first manifest to the existing work entry.

13. The method of claim 12, comprising:
determining, based on item metadata that represents the backup item, whether a combination of the third container index and the first manifest is to be processed using a third back-reference data structure in the third container index;
in response to a determination that the combination of the third container index and the first manifest is not to be processed using the third back-reference data structure:
  loading the first manifest from a persistent storage into the memory;
  determining, based on the first manifest loaded in the memory, a first data unit range that identifies a third set of data units included in the first manifest and that are indexed in the third container index; and
  adding an indication of the first data unit range to the existing work entry.

14. The method of claim 12, comprising:
in response to a determination that the housekeeping work map does not include the existing work entry that identifies the third container index:
  generating a new work entry that identifies the third container index in the housekeeping work map; and
  adding an identifier of the first manifest to the new work entry.

15. A non-transitory machine-readable medium storing instructions that upon execution cause a processor to:
  generate a housekeeping work map to delete a backup item stored in a deduplication storage system, wherein the deduplication storage system stores a plurality of manifests to record an arrival order of a plurality of data units included in the backup item;
  select a first work entry of the housekeeping work map, wherein the first work entry identifies a first container index and a first manifest;
  in response to a selection of the first work entry, load the first container index into the memory, the first container index comprising a back-reference data structure;
  identify, in the back-reference data structure, a back-reference entry indexed to the first manifest;
  determine, using the back-reference entry indexed to the first manifest, a first set of data units included in the first manifest and that are indexed in the first container index; and
  decrement, in the first container index, a set of reference counts for the determined first set of data units.

16. The non-transitory machine-readable medium of claim 15, including instructions that upon execution cause the processor to:
  determine whether a first flag included in the first work entry indicates that a combination of the first container index and the first manifest is to be processed using the back-reference data structure; and
  identify, in the back-reference data structure, the back-reference entry indexed to the first manifest in response to a determination that the first flag indicates that the combination of the first container index and the first manifest is to be processed using the back-reference data structure.

17. The non-transitory machine-readable medium of claim 16, including instructions that upon execution cause the processor to:
  select a second work entry of the housekeeping work map, wherein the second work entry identifies a second container index and a second manifest;
  determine whether a second flag included in the second work entry indicates that a combination of the second container index and the second manifest is to be processed using a second back-reference data structure in the second container index;
  in response to a determination that the second flag does not indicate that the combination of the second container index and the second manifest is to be processed using the second back-reference data structure in the second container index:
    determine, based on data unit range information included in the second work entry, a second set of data units included in the second manifest and that are indexed in the second container index; and
    decrement, in the second container index, a second set of reference counts for the determined second set of data units.

18. The non-transitory machine-readable medium of claim 15, including instructions that upon execution cause the processor to:
  initiate a housekeeping job to delete the backup item;
  identify a set of container indexes affected by the housekeeping job, wherein the set of container indexes includes a third container index, and wherein the first manifest references the third container index;
  determine whether the housekeeping work map includes an existing work entry that identifies the third container index; and
  in response to a determination that the housekeeping work map includes the existing work entry that identifies the third container index, add the identifier of the first manifest to the existing work entry.

19. The non-transitory machine-readable medium of claim 18, including instructions that upon execution cause the processor to:
  determine, based on item metadata that represents the backup item, whether a combination of the third container index and the first manifest is to be processed using a third back-reference data structure in the third container index;
  in response to a determination that the combination of the third container index and the first manifest is not to be processed using the third back-reference data structure:
    load the first manifest from a persistent storage into the memory;

determine, based on the first manifest loaded in the memory, a first data unit range that identifies a third set of data units included in the first manifest and that are indexed in the third container index; and add an indication of the first data unit range to the existing work entry.

20. The non-transitory machine-readable medium of claim 18, including instructions that upon execution cause the processor to:

in response to a determination that the housekeeping work map does not include the existing work entry that identifies the third container index:

generate a new work entry that identifies the third container index in the housekeeping work map; and add an identifier of the first manifest to the new work entry.

* * * * *